US012602212B1

(12) United States Patent
Micallef et al.

(10) Patent No.: US 12,602,212 B1
(45) Date of Patent: Apr. 14, 2026

(54) COMPILING AND EXECUTING STRUCTURED DATA

(71) Applicant: Citibank, N.A., New York, NY (US)

(72) Inventors: Ian James Micallef, London (GB); Lucian Huluta, London (GB); Kranti Midha, London (GB); Wayne Liao, London (GB); Richard Stephen Saunders, London (GB); Michael David Scott, London (GB); Kyrylo Kniazev, London (GB)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/370,567

(22) Filed: Oct. 27, 2025

(51) Int. Cl.
  *G06F 8/41* (2018.01)
  *G06F 11/362* (2025.01)
(52) U.S. Cl.
  CPC .............. *G06F 8/427* (2013.01); *G06F 8/425* (2013.01); *G06F 11/3636* (2013.01)
(58) Field of Classification Search
  CPC ....... G06F 8/425; G06F 8/427; G06F 11/3636
  See application file for complete search history.

(56) References Cited

U.S. PATENT DOCUMENTS

| | | | | |
|---|---|---|---|---|
| 8,473,897 B2 * | 6/2013 | Box | ........................... | G06F 8/42 |
| | | | | 717/106 |
| 9,582,491 B2 * | 2/2017 | Bernelas | ............... | G06F 40/211 |
| 11,822,908 B1 * | 11/2023 | Hatti | ....................... | G06F 8/423 |
| 12,333,392 B2 * | 6/2025 | Sivakumar | .............. | G06F 40/30 |
| 12,500,909 B1 | 12/2025 | Westenberger | | |
| 2017/0060602 A1 | 3/2017 | Self et al. | | |
| 2018/0314622 A1 | 11/2018 | Lowe et al. | | |
| 2022/0329558 A1 | 10/2022 | Khan | | |
| 2023/0252077 A1 * | 8/2023 | Kapp | ....................... | G06F 16/28 |
| | | | | 707/798 |
| 2025/0378001 A1 | 12/2025 | Fedoruk et al. | | |

OTHER PUBLICATIONS

USPTO Non-Final Office Action datd Jan. 12, 2026, U.S. Appl. No. 19/370,560, 22 pages.

* cited by examiner

*Primary Examiner* — Marina Lee
(74) *Attorney, Agent, or Firm* — Davis Wright Tremaine LLP

(57) ABSTRACT

Techniques are provided for processing rules expressed in a domain-specific language. A computing system may receive a rule including an entity identifier, a property of the entity, and one or more logical operators delimited by syntactic tokens of the language. The rule is parsed into an abstract syntax tree (AST) representation that structurally represents entities, properties, and conditional logic, and the AST is transformed into an executable function configured to evaluate input data objects defined according to a machine-readable data model. Execution of the function on input data produces a logical outcome along with intermediate results corresponding to evaluations of individual conditions and logical operators. The computing system generates an execution trace comprising the logical outcome and the intermediate results, the trace being stored in a structured log retrievable to provide evidence of how outcomes were determined.

20 Claims, 10 Drawing Sheets

800

RECEIVE AN EXPRESSION AUTHORED IN DSL — 802

TOKENIZE THE EXPRESSION — 804

VALIDATE THE TOKEN SEQUENCE AGAINST A GRAMMAR DEFINED FOR THE DSL — 806

TRANSFORM THE AST INTO AN EXECUTABLE FUNCTION — 808

APPLY THE EXECUTABLE FUNCTION TO AN INPUT DATA OBJECT STRUCTURED ACCORDING TO A MACHINE-READABLE DATA MODEL — 810

GENERATE AN EXECUTION TRACE — 812

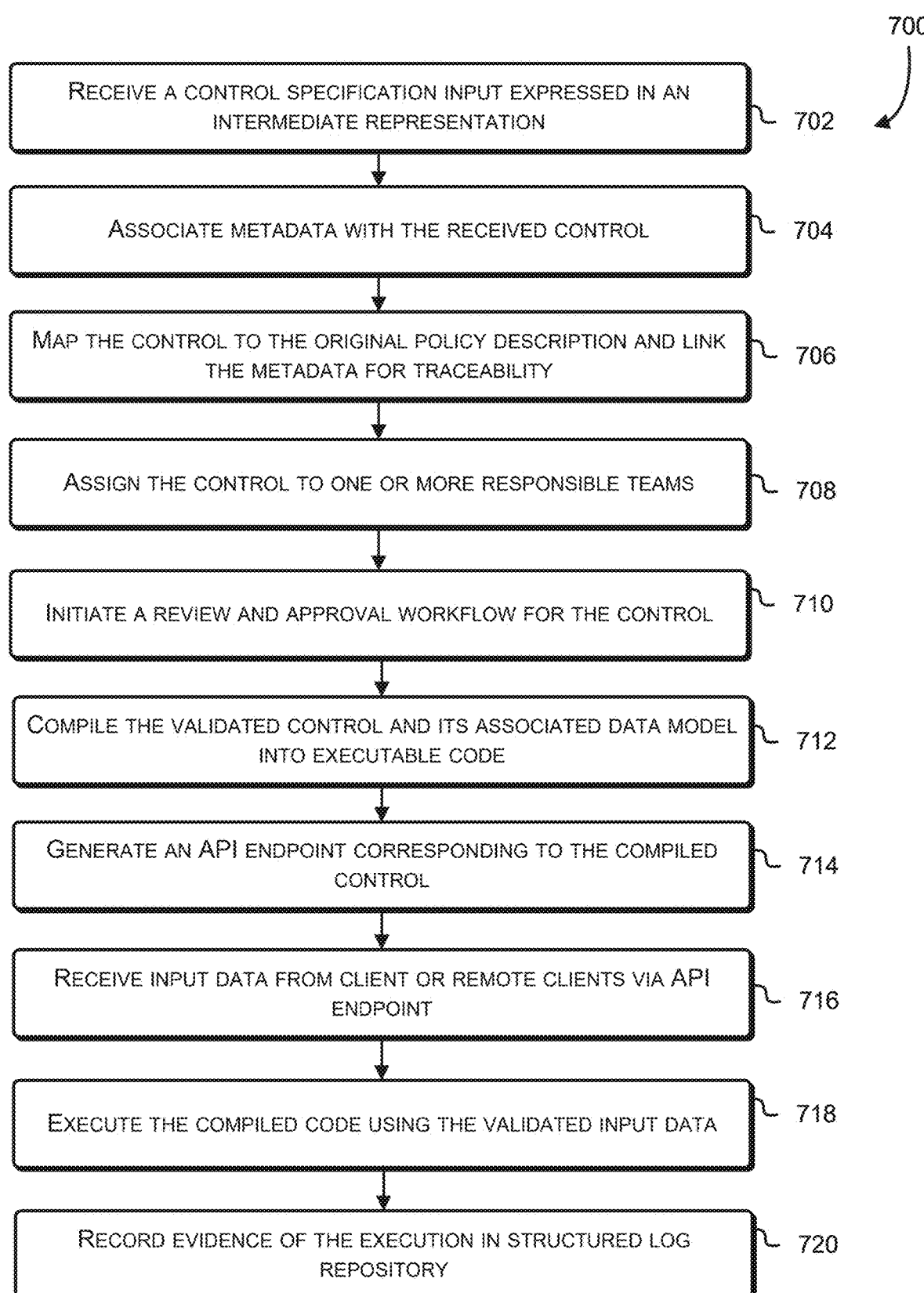

700

RECEIVE A CONTROL SPECIFICATION INPUT EXPRESSED IN AN INTERMEDIATE REPRESENTATION ⌐ 702

ASSOCIATE METADATA WITH THE RECEIVED CONTROL ⌐ 704

MAP THE CONTROL TO THE ORIGINAL POLICY DESCRIPTION AND LINK THE METADATA FOR TRACEABILITY ⌐ 706

ASSIGN THE CONTROL TO ONE OR MORE RESPONSIBLE TEAMS ⌐ 708

INITIATE A REVIEW AND APPROVAL WORKFLOW FOR THE CONTROL ⌐ 710

COMPILE THE VALIDATED CONTROL AND ITS ASSOCIATED DATA MODEL INTO EXECUTABLE CODE ⌐ 712

GENERATE AN API ENDPOINT CORRESPONDING TO THE COMPILED CONTROL ⌐ 714

RECEIVE INPUT DATA FROM CLIENT OR REMOTE CLIENTS VIA API ENDPOINT ⌐ 716

EXECUTE THE COMPILED CODE USING THE VALIDATED INPUT DATA ⌐ 718

RECORD EVIDENCE OF THE EXECUTION IN STRUCTURED LOG REPOSITORY ⌐ 720

FIG. 7

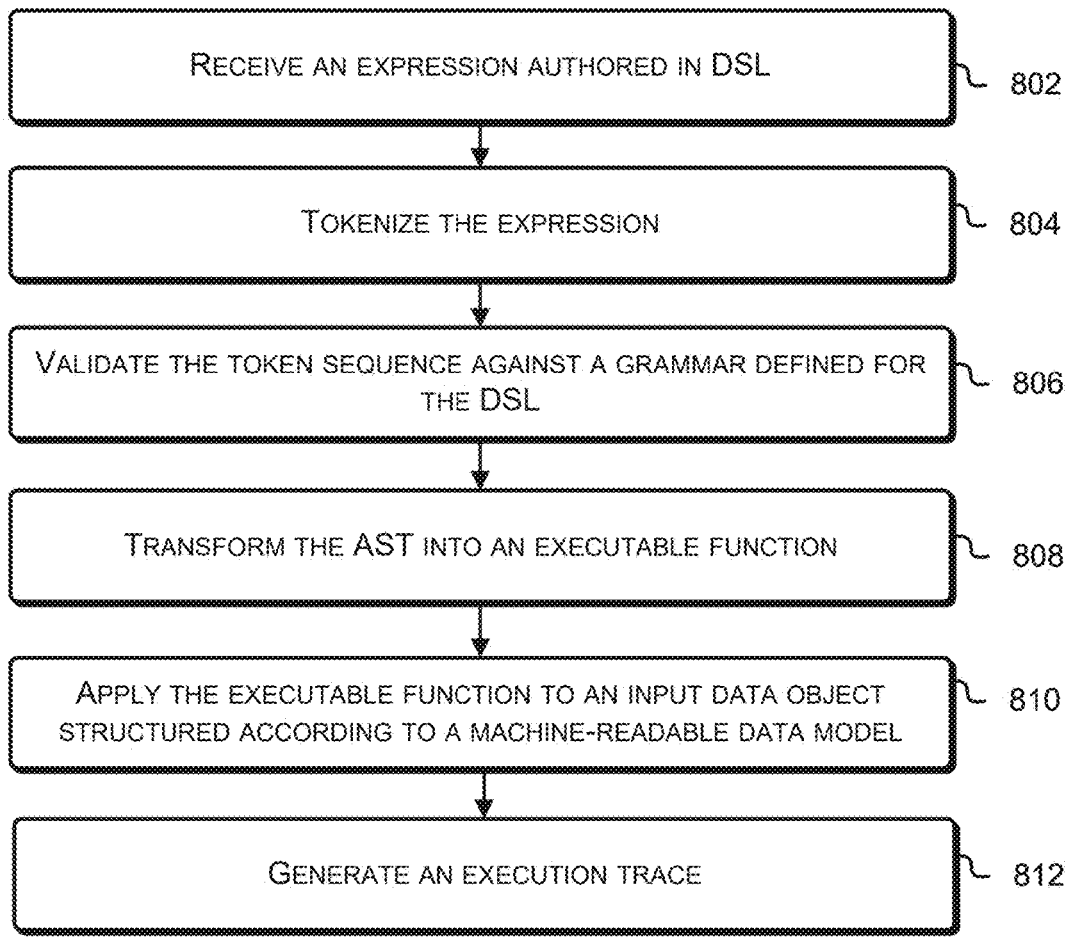
800
RECEIVE AN EXPRESSION AUTHORED IN DSL    802
TOKENIZE THE EXPRESSION    804
VALIDATE THE TOKEN SEQUENCE AGAINST A GRAMMAR DEFINED FOR THE DSL    806
TRANSFORM THE AST INTO AN EXECUTABLE FUNCTION    808
APPLY THE EXECUTABLE FUNCTION TO AN INPUT DATA OBJECT STRUCTURED ACCORDING TO A MACHINE-READABLE DATA MODEL    810
GENERATE AN EXECUTION TRACE    812
FIG. 8

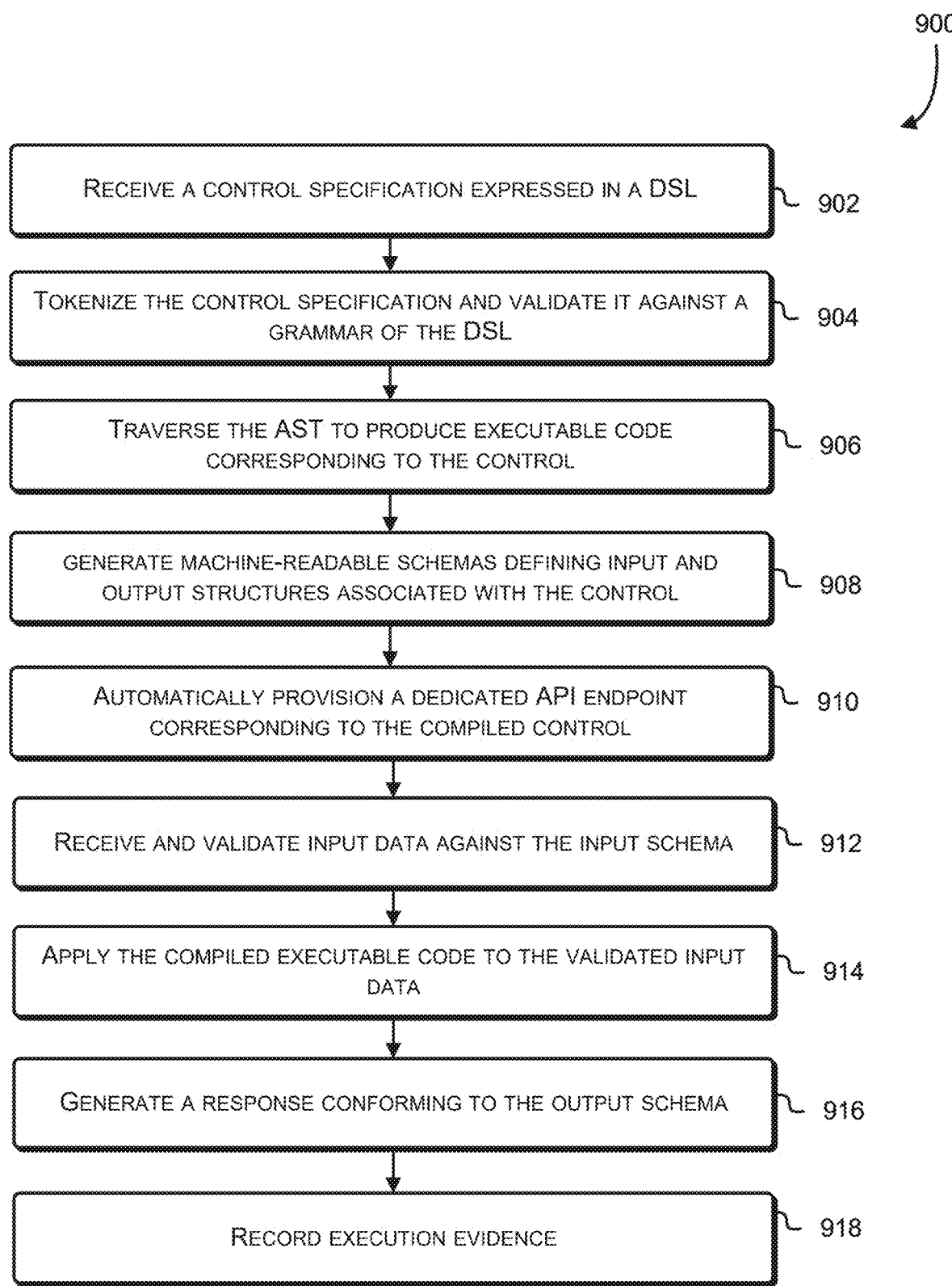

900

RECEIVE A CONTROL SPECIFICATION EXPRESSED IN A DSL — 902

TOKENIZE THE CONTROL SPECIFICATION AND VALIDATE IT AGAINST A GRAMMAR OF THE DSL — 904

TRAVERSE THE AST TO PRODUCE EXECUTABLE CODE CORRESPONDING TO THE CONTROL — 906

GENERATE MACHINE-READABLE SCHEMAS DEFINING INPUT AND OUTPUT STRUCTURES ASSOCIATED WITH THE CONTROL — 908

AUTOMATICALLY PROVISION A DEDICATED API ENDPOINT CORRESPONDING TO THE COMPILED CONTROL — 910

RECEIVE AND VALIDATE INPUT DATA AGAINST THE INPUT SCHEMA — 912

APPLY THE COMPILED EXECUTABLE CODE TO THE VALIDATED INPUT DATA — 914

GENERATE A RESPONSE CONFORMING TO THE OUTPUT SCHEMA — 916

RECORD EXECUTION EVIDENCE — 918

FIG. 9

COMPILING AND EXECUTING STRUCTURED DATA

CROSS-REFERENCE TO RELATED APPLICATION

This application incorporates by reference for all purposes the full disclosure of co-pending U.S. patent application Ser. No. 19/370,560, filed concurrently herewith, entitled "COMPILING AND EXECUTING STRUCTURED DATA".

BACKGROUND

Computing systems across many industries process large volumes of structured and unstructured data while ensuring that data handling operations conform to prescribed rules. These rules are often first documented in natural language, which introduces ambiguity and requires manual translation into technical implementations. Such manual approaches can lead to inconsistencies, inefficiencies, and difficulties in verifying correctness at scale.

SUMMARY

As systems become increasingly interconnected and data-driven, there is a growing need for techniques that allow rules and conditions to be expressed in machine-processable formats that can be compiled, validated, and executed automatically, while still remaining traceable to their human-authored sources. Techniques and systems described herein relate to improving computer functionality by enabling organizational policies to be codified as executable controls that can be compiled, executed, and audited in a consistent and automated manner. A computing system and be provided that accepts policy descriptions in natural language or other formats and transforms them into intermediate representations expressed in a domain-specific language (DSL). In some examples, the descriptions accepted by the computing system can include standards, procedures, and/or regulations. These representations can then be parsed, compiled, and exposed as executable rules available for integration with applications and services across distributed computing environments.

In one aspect, the system includes a structured workflow that can include control authoring. Policies expressed in natural language can be translated into codified rules using a DSL designed for machine readability and evaluation. The DSL permits specification of entities, properties, and logical operators in a syntax that can be formally defined by a grammar. By expressing rules in a DSL, ambiguity can be eliminated, enabling consistent interpretation by the computing system.

A parsing component converts DSL rules into abstract syntax tree (AST) representations. The AST captures the structure of entities, attributes, and conditional logic in a hierarchical format that can be efficiently processed. Compiler modules traverse the AST to generate executable instructions used for evaluating structured data models. This compiler transformation improves performance, supports static validation, and transforms rules into deterministic execution paths.

To support execution, the computing system automatically generates machine-readable data models defining the attributes required for evaluation. For example, a JavaScript Object Notation (JSON) schema can be generated to specify the expected structure of input data objects. Data models include mandatory and optional fields, attribute types, and constraints, allowing the computing system to validate incoming payloads prior to execution. This schema generation restricts evaluation to properly structured inputs, reducing execution errors and improving system reliability.

Each codified control can be automatically associated with a dedicated application programming interface (API) endpoint. The endpoint can be generated at the time of control creation and configured with the request and response schemas derived from the data model. This automatic endpoint provisioning enables applications to submit data for evaluation using standard API calls, without requiring custom integration work. Each endpoint can also be published with programmatically accessible documentation, such as an OpenAPI (Swagger) specification, simplifying adoption across the enterprise.

The execution engine receives input data through the generated API endpoint, validates the input against the schema, and executes the compiled code associated with the control. The execution produces a logical outcome indicating compliance or non-compliance with the conditions expressed in the rule. Intermediate results produced during execution, such as outcomes of individual conditional expressions, can also be captured. These intermediate values provide insight into system operation, facilitating debugging, verification, and audit.

Execution traces are generated, in some embodiments automatically, and stored by the computing system. Each trace includes the logical outcome, intermediate values, timestamps, and identifiers that uniquely associate each run with a control version and input payload. Traces are recorded in structured logs, indexed by execution identifiers and queryable through an audit interface. By maintaining structured execution data, the platform provides verifiable evidence of compliance processing, supporting audits, regulatory reporting, and forensic analysis.

The computing system further associates metadata with each control, including version identifiers, author identifiers, references to source file locations, and links to related policies or standards. Metadata provides traceability from codified controls back to their originating policies. This linkage provides accountability, as changes to policies and corresponding controls can be tracked over time. The metadata also supports automated notifications and review workflows when policies are updated, so that controls remain aligned with organizational requirements.

Controls created on the computing system are subject to review and approval workflows. These workflows help ensure that codified rules are validated by responsible teams prior to deployment. Review sequences may include validation of DSL syntax, automated test case execution, and human review by subject matter experts. By embedding review and approval mechanisms, the computer system enforces consistency and reduces the risk of errors in deployed controls.

Once approved, controls are compiled and deployed with their associated API endpoints. External applications, services, or automated processes can then interact with the endpoints to submit data for compliance evaluation. Responses returned by the endpoints conform to predefined schemas, typically including evaluation results and diagnostic information. This consistency enables seamless integration with external systems, reducing the need for custom adapters or one-off integrations.

In addition to evaluation, the platform provides query interfaces for retrieving stored execution traces and logs. Authorized users can query execution history by execution identifier, control identifier, or time range. Results can be visualized in dashboards or exported for external review. These interfaces improve transparency, enabling auditors and administrators to verify compliance outcomes without requiring manual data collection.

Another aspect of the platform is the ability to generate multiple endpoints automatically, each associated with a distinct control. Endpoints can be dynamically created and maintained by the system, with corresponding input and output schemas derived from each control's definition. The platform can maintain associations between endpoints, their data models, and their compiled executables, allowing integrations to remain consistent as controls evolve.

Techniques described herein improve the functioning of computing systems by reducing manual steps required to translate policies into executable code, eliminating inconsistencies that arise from ad hoc implementations, and providing automated mechanisms for integration and monitoring. Automatic compilation, endpoint generation, and structured logging reduce processing errors, improve system transparency, and enable controls to be evaluated programmatically across distributed environments.

From a technical perspective, the described approaches improve data validation and processing efficiency. From a technical perspective, the described approaches improve data validation and processing efficiency because the computing system enforces schema-based validation before execution, ensuring that well-formed payloads are processed. This eliminates runtime errors that otherwise occur when malformed data reaches the execution engine, reducing wasted central processing unit (CPU) cycles and error-handling overhead. Additionally, by compiling structured specifications into deterministic executable code, the system avoids repetitive interpretation of textual rules at runtime. Precompiled logic allows the processor to evaluate conditions directly, improving throughput and lowering latency. Intermediate values and execution traces are recorded automatically without requiring secondary passes or manual debugging, further reducing resource consumption. Together, schema validation and compiler-style code generation enable the computing system to process larger volumes of input data more efficiently while maintaining correctness and traceability. Schema validation checks input payloads for proper structure before execution, which reduces runtime errors and improves computing system performance and efficiency.

The disclosed techniques further improve interoperability of computing systems. By exposing standardized API endpoints with machine-readable schemas and automatically generated documentation, the platform enables external applications to interact with compliance logic through consistent programmatic interfaces. This reduces integration costs, minimizes custom coding, and ensures that data exchange occurs in predictable and reliable formats. For example, by reducing integration costs and minimizing the need for custom coding, the system avoids duplication of effort across different applications and services. Standardized schemas and automatically generated documentation allow external systems to connect using predictable formats, which reduces the time and computational resources spent handling incompatible or malformed data. Because data exchange occurs in reliable, well-defined formats, the computing system spends fewer cycles performing error correction, format translation, or exception handling, and can instead focus processing resources on executing other tasks. This predictability improves throughput, lowers latency in distributed environments, and enables more scalable integration, ultimately allowing computing systems to run more efficiently and with greater reliability.

Overall, techniques described and suggested in the present disclosure improve the field of computing, particularly the areas of compiler technology, schema validation, and API based system integration. The described system provides technical solutions to problems of traceability, transparency, and scalability in compliance enforcement, while reducing reliance on manual processes. By automating translation, compilation, endpoint provisioning, and structured logging, the described systems enhance the efficiency, accuracy, and auditability of compliance systems in modern distributed computing environments.

In one embodiment, a computer-implemented method is provided. The method includes receiving, by a computing system and via a user interface, a control comprising an intermediate representation of a policy description and a data model associated with the control, wherein the control is configured in a machine-readable language distinct from the policy description. The method further includes associating metadata with the control, the metadata including version information of the control and one or more users associated with the control. The computing system maps the control to the policy description and links the metadata to the policy description for traceability. The method also includes assigning the control to one or more responsible teams and initiating a review and approval workflow for the control. The control and associated data model are compiled into executable code, the executable code comprising computer instructions to evaluate compliance of the policy description based on the control. An API endpoint specific to the control is automatically generated, wherein the API endpoint includes a request schema defined by the data model, and wherein the endpoint is published to a network for remote programmatic access. The computing system receives, via the API endpoint, input data formatted in accordance with the request schema and executes the compiled executable code using the input data to automatically determine compliance with the control, the determination being performed without human intervention. The computing system further records, in a non-transitory memory, evidence of each execution of the compiled executable code, the evidence including the input data, an execution result, and a timestamp, wherein the recorded evidence is accessible via an audit interface of the user interface to display execution history associated with the compiled executable code.

From a practical application standpoint, the disclosed method provides a specific utility by enabling computing systems to transform natural language policy descriptions into executable controls that can be automatically validated and enforced across distributed environments. The method demonstrates substantial utility because it operates in its present form to provide immediate and concrete benefits, such as real-time compliance validation, automated traceability, and structured evidence generation, without requiring further research or modification. The method also provides credible utility because a person of ordinary skill in the art would recognize, based on the detailed disclosure, that implementing parsing, compilation, schema management, and endpoint generation in the described manner improves system efficiency by reducing manual translation steps, eliminating redundant evaluations through optimized executable code, validating data against machine-readable schemas before execution, and enabling consistent programmatic integration via standardized endpoints. These technical improvements allow compliance evaluations to be executed more quickly, reliably, and at scale, which enhances the overall operation of computing systems. In some examples, natural language policy descriptions can be converted into structured representations or DSL expressions using a parsing engine that applies entity recognition, pattern templates, or trained language models to identify policy entities, attributes, and logical relationships. The resulting structured form can then be represented as a control or rule suitable for automated enforcement. In some implementations, the computing system can include a policy interpretation module configured to analyze a natural language policy description, extract key semantic elements (e.g., entities, operations, and constraints), and translate them into a structured representation or DSL rule. The interpretation module may leverage predefined syntax templates, ontology-based mappings, or trained machine-learning models to perform this translation, producing a control that the system can execute or evaluate.

In some embodiments, a computer-implemented method comprises receiving, by a computing system, a rule expressed in a DSL, the rule specifying entities, properties, and logical operators. The computing system tokenizes the DSL input into lexical units such as identifiers, operators, and literals, each token tagged with type and position information. The computing system validates the tokenized input against a grammar of the DSL to ensure conformity with defined syntax and structure. The computing system constructs an AST that structurally represents the conditional logic, entities, and properties defined in the DSL, with the AST including nodes for tokens and edges encoding hierarchical relationships between conditions. The computing system traverses the AST to generate executable code, the executable code comprising program instructions, conditional statements, or comparison operations configured to evaluate structured input data. The computing system then applies the executable code to an input data object formatted according to a machine-readable schema, producing a logical evaluation result. The computing system further generates an execution trace that includes the logical outcome of the rule and intermediate results corresponding to each condition and operator evaluation, the execution trace being recorded in a non-transitory memory for later review.

From a practical application standpoint, this method provides specific utility by transforming high-level rule specifications expressed in DSL into machine-executable code that can directly validate structured data inputs. It has substantial utility because it operates in real-world computing systems to immediately enable deterministic evaluation of input data without requiring fragmented computer-implemented translation or interpretation. The method demonstrates credible utility because a skilled practitioner would recognize, based on the detailed disclosure, that tokenization, grammar validation, AST construction, and executable code generation are established compiler techniques that, when applied as described, improve computing system efficiency by ensuring inputs are validated before execution, eliminating ambiguity, reducing runtime errors, and enabling the recording of execution traces for transparency. These improvements result in faster and more reliable rule evaluation, enhancing both accuracy and auditability in large-scale computing environments.

In at least one embodiment, a computer-implemented method comprises receiving, by a computing system via a user interface, a control expressed in a machine-readable language distinct from a natural language policy description, the control including an intermediate representation of the policy description and an associated data model. The computing system generates metadata associated with the control, including version identifiers, author identifiers, and semantic mappings linking elements of the machine-readable control to schema attributes. The computing system compiles the control into executable code, embedding instrumentation hooks to capture intermediate values and operator results during execution. The computing system generates an input schema defining required fields, optional fields, and data types expected in incoming payloads, and an output schema defining evaluation results and diagnostic information returned after execution. The computing system validates input data received via an automatically generated API endpoint against the input schema, executes the compiled executable code using the validated input, and produces an execution result indicating whether the input satisfies the conditions of the control. Intermediate values produced during evaluation are embedded in an execution trace. The computing system returns a response conforming to the output schema, including the evaluation result, diagnostic information, and metadata such as timestamps and execution identifiers. Execution evidence, including input payloads, evaluation results, intermediate values, and metadata, is recorded in a structured log repository accessible through an audit interface for subsequent analysis.

From a practical application standpoint, this method provides specific utility by enabling machine-readable controls derived from natural language policies to be compiled, executed, and audited in a consistent and automated manner. It demonstrates substantial utility because it functions in operational computing systems to provide immediate and significant benefits, including real-time compliance validation, automated schema-based input checking, and generation of structured responses for integration into distributed applications. The method provides credible utility because a person of ordinary skill in the art would recognize, based on the disclosure, that compiling controls into executable code, generating schemas, embedding instrumentation hooks, and recording structured execution evidence improve computing efficiency by reducing incremental computing system interventions, minimizing execution errors, and ensuring that results are traceable through logs and audit interfaces. These technical enhancements allow computing systems to evaluate policy compliance at scale, while maintaining transparency, reproducibility, and accountability of outcomes.

In at least one example, a platform is provided that manages compliance controls in an automated, auditable, and scalable way. The platform allows policy owners to create and codify organizational policies as machine-executable rules in a human- and machine-readable language. These controls are automatically compiled into executable code (currently Python, with additional language support planned) and exposed via unique API endpoints, allowing direct integration with business applications and systems. The platform includes AI-powered tools assist policy owners in drafting controls by translating English policy descriptions into codified rules, generates test scenarios, and can highlight potential errors. Controls, facilitated by the platform, are subject to a structured review and approval workflow before publication, ensuring accuracy and accountability. Once deployed, executions of a control, triggered by data posted to its API, are logged in detail, supporting real-time monitoring, auditing, compliance verification, and troubleshooting. The platform further supports control versioning, automated notifications for policy updates, comprehensive test case management, and traceability, linking codified controls back to their source policies and standards through metadata. This comprehensive approach enables organizations to ensure consistent enforcement of compliance requirements while maintaining transparency and auditability for regulators and internal stakeholders.

In at least one example, a unique, domain-specific codified language is provided and designed for expressing organizational policies, business rules, and compliance standards in a format that is both easily understood by humans and processable by computers. The language serves as an intermediate representation between traditional policy documents (written in plain English) and executable code (such as Python). Unlike general-purpose programming languages or typical English narratives, this language is purpose-built to clearly articulate requirements, conditions, and controls without ambiguity, enabling automation and reducing the risk of human misinterpretation. When authored in this codified language, policies are coupled with structured data models (such as JSON) and then automatically compiled by the platform into executable code. This process enables policies to be enforced programmatically, ensures consistent interpretation, and allows for seamless integration with other systems.

In at least one example, an automated mechanism is provided for generating customized API endpoints and data models for every codified control. When a control is authored and defined in the platform, the system dynamically creates a dedicated API endpoint tailored to that specific control. The input and output schemas for each endpoint are defined at the time of control creation, ensuring that the API precisely matches the control's data requirements. This dynamic schema generation also extends to the automatic creation of endpoint documentation, making it easy for applications across the organization to integrate with the control via the correct data formats. As a result, applications can interact seamlessly with compliance controls, posting the required data for validation and receiving standardized responses.

BRIEF DESCRIPTION OF THE DRAWINGS

Various techniques will be described with reference to the drawings, in which:

FIG. 7 is a flowchart illustrating an example of a process for codifying and executing a control specification, in accordance with various embodiment;

FIG. 8 is a flowchart illustrating an example of a process for parsing and executing a rule expressed in a domain-specific language, in accordance with various embodiments;

FIG. 9 is a flowchart illustrating an example of a process for automatically generating and executing an API endpoint corresponding to a codified control, in accordance with various embodiments.

DETAILED DESCRIPTION

Figure 1:
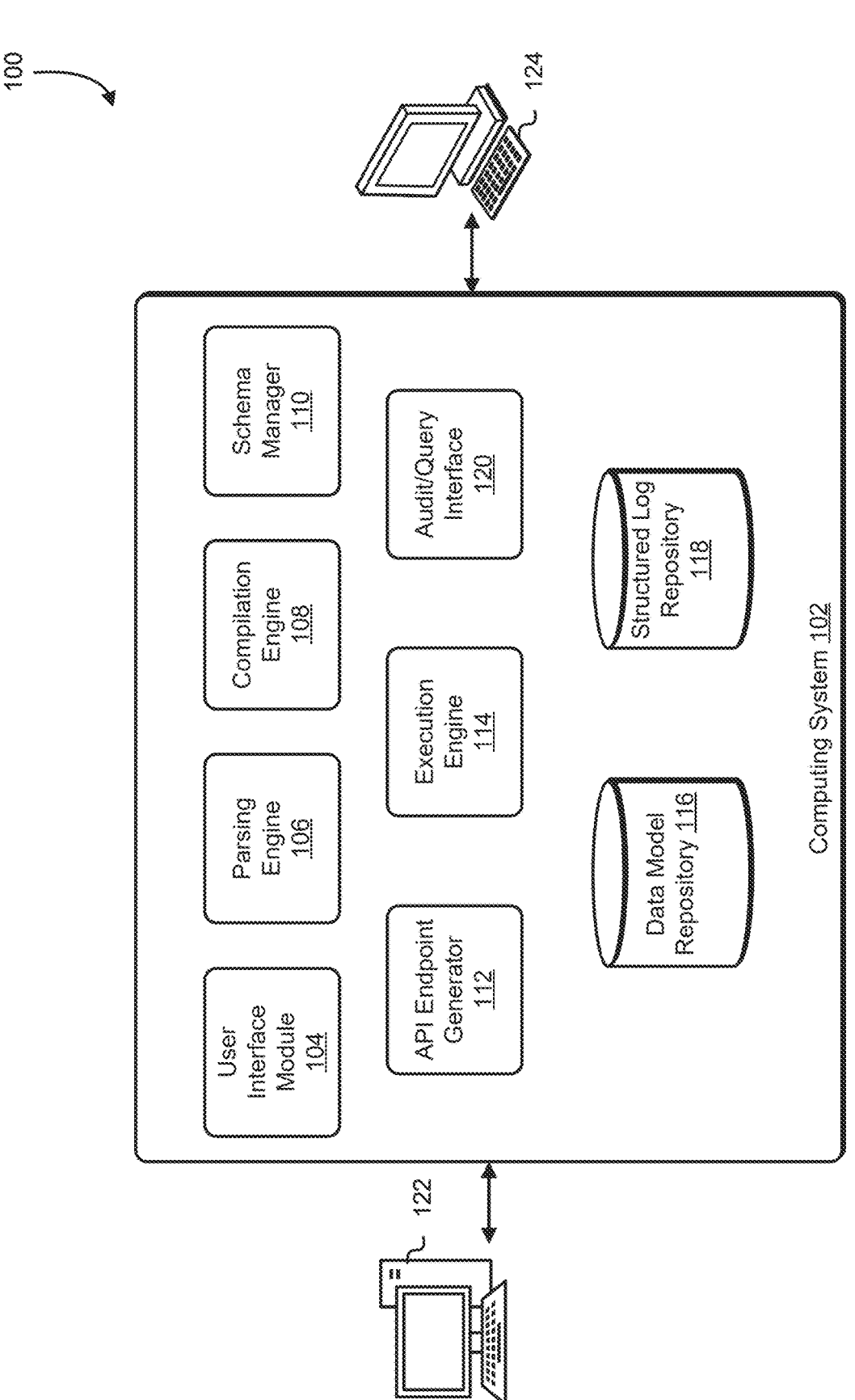
FIG. 1 illustrates an example computing environment in which a computing system coordinates the transformation of rule specifications into executable components, schemas, endpoints, and audit logs, in accordance with various embodiments.

FIG. 1 illustrates an example computing environment 100 in which a computing system 102 coordinates the transformation of rule specifications into executable components, schemas, endpoints, and audit logs. Computing system 102 may be implemented as a server, a cluster of machines in a data center, or as distributed microservices deployed across cloud infrastructure. In at least one embodiment, computing system 102 includes one or more processors, volatile and non-volatile memory, network adapters, and storage subsystems. The components illustrated within computing system 102 are shown as functional blocks that can be implemented in software executed by the processors, in programmable logic such as FPGAs, in specialized hardware accelerators, or as a combination of software and hardware components.

The computing system 102 includes a user interface module 104 that enables specifications to be entered and managed. In at least one embodiment, user interface module 104 is implemented as a web application that presents forms, editors, or configuration panels. For instance, a specification may define a control expressed in a domain-specific language that evaluates whether a given customer record satisfies certain conditions. As one example, a specification entered through user interface module 104 may be expressed in a DSL that uses syntactic tokens to delimit entity identifiers, properties, and logical operators. For instance, the specification "{Customer}[Age]>=18 AND {Customer}[Status]='Active'" defines a control to determine whether a customer record satisfies minimum age and status requirements. In this example, the entity identifier {Customer} is delimited by curly braces, the properties [Age] and [Status] are delimited by square brackets, and the operators ">=" and "=" define conditional logic. The full expression constitutes a specification, which may be submitted with metadata such as a control identifier, version tag, or author identifier to provide traceability during later parsing, compilation, and execution.

A user may enter a control expressed in a structured representation distinct from natural language or a rule expressed in a DSL that uses syntactic tokens to delimit entity identifiers and properties. The user interface module 104 may embed syntax highlighting, autocomplete, or error checking to assist in authoring specifications. In some embodiments, module 104 also accepts metadata associated with each specification, including version identifiers, user identifiers, team assignments, and pointers to source files. Such metadata is stored in association with the specification to provide traceability.

In at least one embodiment, once a specification is submitted, it is processed by parsing engine 106. In at least one embodiment, parsing engine 106 is operable to tokenize the specification and validate its conformance to a grammar associated with the DSL. In at least one embodiment, parsing engine 106 generates an AST that structurally represents the entities, properties, and logical operators contained in the specification. The AST can include nodes that represent syntactic constructs and edges that represent parent-child relationships, thereby encoding hierarchical logic. If an identifier or property is not defined in the grammar, parsing engine 106 may reject the specification and return an error to user interface module 104. In some implementations, parsing engine 106 maintains a library of grammars for different policy or rule domains and can select an appropriate grammar based on metadata or user input.

The output of parsing engine 106 can be provided to compilation engine 108. Compilation engine 108 traverses the AST to produce executable code. In at least one embodiment, compilation engine 108 generates intermediate instructions in a bytecode format, which can then be interpreted or just in time (JIT) compiled at runtime. In other embodiments, compilation engine 108 generates source code in a general-purpose language such as Python or Java, which can be executed directly by runtime environments. Compilation may further include instantiating code templates stored in memory, applying optimization rules to reduce redundant condition evaluations, and embedding instrumentation hooks for collecting intermediate values. In at least one embodiment, the result of compilation is executable code configured to evaluate input data objects against the conditions or rules specified in the original input.

Schema manager 110 derives machine-readable data models to define the structure of input and output data. In at least one embodiment, schema manager 110 generates JSON schemas that define required fields, optional fields, data types, and validation constraints. For controls that evaluate compliance, the input schema may describe the format of input records, while the output schema may define logical results and diagnostic fields. Schema manager 110 may also merge base schemas with control-specific schemas to create composite schemas models. In at least one embodiment, schema manager 110 interacts with a data model repository 116 to store versioned schemas and support retrieval for later executions.

API endpoint generator 112 may provision dedicated application programming interface endpoints for compiled specifications. In at least one embodiment, generator 112 uses the request schema from schema manager 110 to define the input format and the response schema to define the output format. The endpoints may be Representational State Transfer (REST)-ful APIs accessible via Hypertext Transfer Protocol (HTTP), Remote Procedure Call (RPC) interfaces (e.g., gRPC interfaces), or other protocol endpoints. Generator 112 may also automatically produce documentation describing each endpoint, including sample requests, sample responses, and OpenAPI specifications. In some embodiments, generator 112 generates dynamic Swagger user interface (UI) pages that display schema definitions and example payloads, enabling users and client systems to easily interact with endpoints.

Execution engine 114 receives requests from remote clients through the API endpoints. In at least one embodiment, execution engine 114 first validates the input data against the schema defined by schema manager 110. If the input data conforms to the schema, execution engine 114 invokes the compiled code produced by compilation engine 108 to perform evaluations. Intermediate results corresponding to conditions and logical operators may be produced and retained for audit purposes. The execution engine 114 generates a logical outcome indicating whether the input data satisfies the conditions specified in the control or rule. The response can be constructed to conform to the output schema, including evaluation results, diagnostic values, and metadata such as timestamps and execution identifiers.

Data model repository 116 stores the schemas and associated metadata generated by schema manager 110. In at least one embodiment, repository 116 is implemented as a document database that supports versioning, indexing, and query. In at least one embodiment, the document database can be implemented as a set of databases including one or more separate databases. The repository may maintain mappings between schema attributes and AST nodes generated by parsing engine 106, enabling traceability between high-level constructs and low-level evaluation logic. In some implementations, repository 116 also stores predefined schema fragments that can be reused across multiple controls or rules. In at least one embodiment, data model repository 116 also stores machine-readable endpoint artifacts, including OpenAPI/Swagger specifications and example payloads associated with generated endpoints, to facilitate versioned retrieval of both schemas and documentation.

Structured log repository 118 stores execution records generated by execution engine 114. In at least one embodiment, repository 118 is implemented as a time-series database or append-only log optimized for high-volume writes and indexed queries. In at least one embodiment, the document database can be implemented as a set of databases including one or more separate databases. Each execution record may include the input data, intermediate values, evaluation results, a timestamp, and a unique execution identifier. Storing intermediate values allows for reconstruction of evaluation traces, enabling auditors or automated systems to understand how outcomes were determined. Repository 118 may also store references to the schema versions and executable code versions used for each execution.

Audit and query interface 120 provides access to the execution records stored in repository 118. In at least one embodiment, audit interface 120 exposes a query engine that accepts parameters such as execution identifier, time range, or control identifier and returns subsets of structured logs. Results may be displayed in dashboards, exported to external analysis tools, or retrieved via programmatic APIs. In some implementations, interface 120 also provides visualization of execution traces, showing condition evaluations and logical operator results step by step.

External to computing system 102, FIG. 1 illustrates a user device 122 and remote clients 124. User device 122 represents a computing device operated by an author, administrator, or auditor. In at least one embodiment, user device 122 communicates with user interface module 104 to submit specifications and metadata, and also accesses audit and query interface 120 to review execution histories. User device 122 may be a laptop, desktop, thin client, mobile device, or other computing device and may interact with computing system 102 over a secure web interface or API. Remote clients 124 represent applications or services that programmatically interact with endpoints generated by API endpoint generator 112. In at least one embodiment, remote clients 124 may include enterprise applications, automated testing frameworks, monitoring tools, or event-driven microservices that post input data to endpoints and receive evaluation results in schema-compliant formats. Communications between user device 122, remote clients 124, and computing system 102 occur over one or more networks, which may include local area networks, wide area networks, cloud service fabrics, or encrypted tunnels.

Overall, the architecture illustrated in FIG. 1 supports the complete lifecycle of receiving structured specifications, parsing and compiling them into executable code, generating schemas and endpoints, executing the code on structured input data, producing traceable outcomes, recording execution data, and enabling audit and query of execution histories. In at least one embodiment, these components cooperate to provide a platform that integrates parsing of structured specifications, dynamic generation of schemas and endpoints, execution of compiled logic, and storage and retrieval of structured audit data, thereby improving computing systems by automating rule enforcement, supporting schema-level validation, and enabling efficient, queryable auditability.

Figure 2:
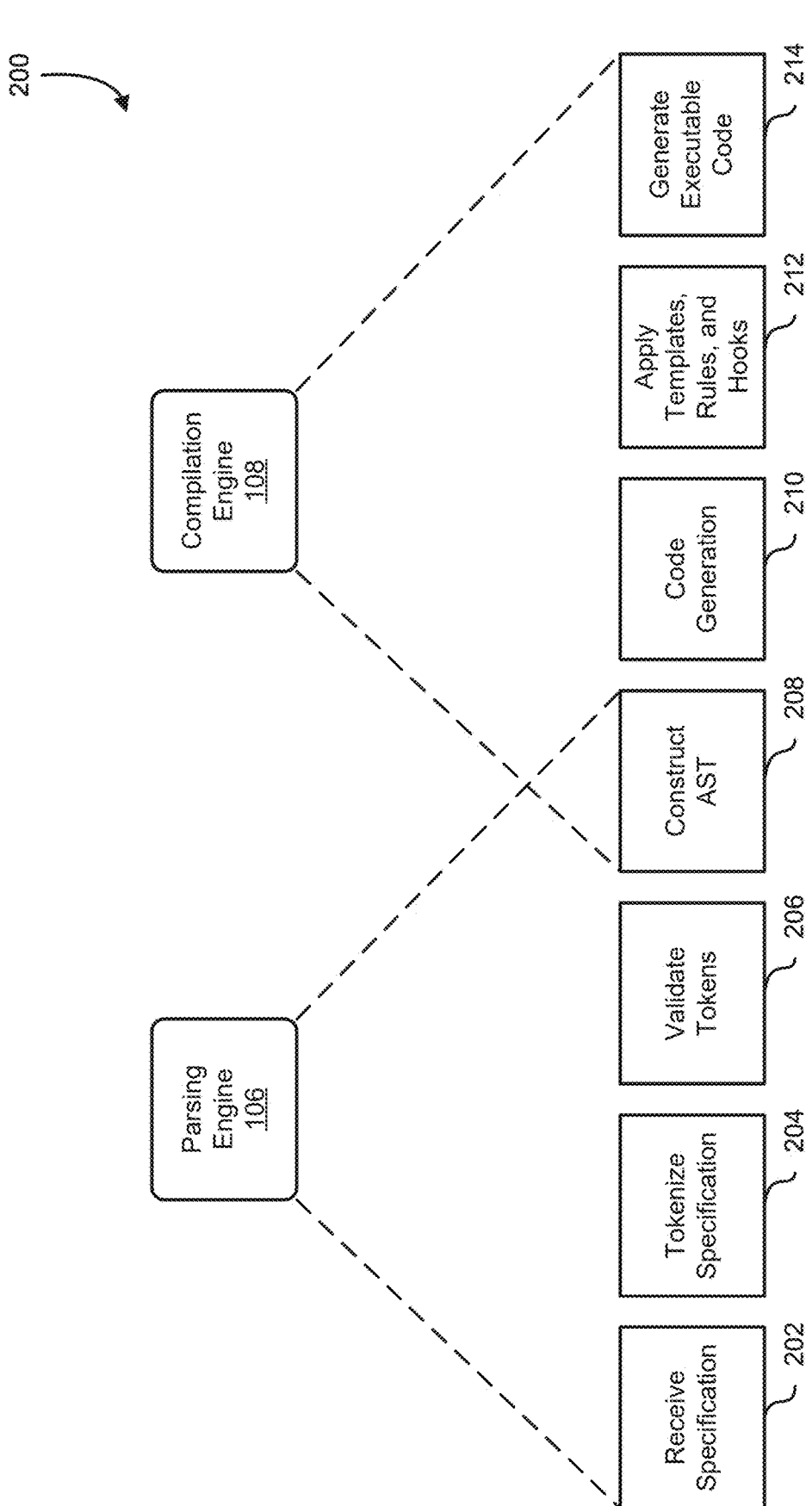
FIG. 2 illustrates an example parsing and compilation workflow performed by a computing system to transform structured specifications into executable code, in accordance with various embodiments.

FIG. 2 illustrates an example parsing and compilation workflow 200 performed by a computing system to transform structured specifications into executable code. The workflow 200 may be implemented within computing system 102 of FIG. 1, with operations carried out by parsing engine 106 and compilation engine 108. In at least one embodiment, the workflow enables expressions, controls, or rules expressed in a DSL to be converted into machine-executable instructions.

The workflow begins at 202, where a specification expressed in a DSL can be received. The specification may include syntactic tokens delimiting entity identifiers, properties, and logical operators. In at least one embodiment, the specification is provided through user interface module 104 and transmitted to parsing engine 106 as a structured text stream.

For example, the specification may be authored in a DSL that uses syntactic tokens to delimit different components. In at least one embodiment, an entity identifier may be enclosed in curly braces, a property of that entity may be enclosed in square brackets, and logical operators may be expressed using predefined symbols. A sample specification might be expressed as: {Customer}[Age]>=18 AND {Customer}[Status]="Active".

In this example, {Customer} represents an entity identifier delimited by curly braces, [Age] and [Status] represent properties delimited by square brackets, and the operators>= and = are logical operators defining conditions between the properties and their expected values. When entered through user interface module 104, this specification may be transmitted as a structured text stream to parsing engine 106, which tokenizes the input into discrete lexical units such as the entity identifier (Customer), properties (Age, Status), and operators (>=, =, AND).

At block 204, parsing engine 106 tokenizes the specification. Tokenization involves segmenting the input into lexical units such as keywords, identifiers, delimiters, and operators. In at least one embodiment, a lexical analyzer is implemented using finite-state automata configured to recognize token boundaries. Tokenization ensures that the subsequent parsing process operates on a normalized stream of tokens rather than raw text.

For example, consider the input specification: {Order}[Total]>100 AND {Order}[Status]="Open". When parsing engine 106 performs tokenization, the raw character stream can be segmented into lexical units. In at least one embodiment, the resulting token sequence may include: Entity identifier token: {Order}; Property token: [Total]; Operator token: >; Numeric literal token: 100; Logical operator token: AND; Entity identifier token: {Order}; Property token: [Status]; Operator token: =; String literal token: "Open".

Each token may be tagged with a type (e.g., entity, property, operator, literal, logical connector) and position information in the input stream. In at least one embodiment, rules or delimiters associated with the DSL are used to recognize token boundaries (e.g., curly braces delimit entities, square brackets delimit properties, quotation marks delimit string literals). This normalization into a token stream allows the subsequent parsing stage (block 206) to build an abstract syntax tree without needing to interpret raw text.

At block 206, parsing engine 106 validates the tokens against a grammar of the DSL. The grammar defines permissible token sequences and structural rules. In at least one embodiment, the grammar may be represented in any suitable formalism, and the parser may employ any deterministic or nondeterministic parsing technique. Invalid expressions that fail grammar checks may be rejected, with error messages returned to user interface module 104.

At block 208, parsing engine 106 constructs an abstract syntax tree (AST) that structurally represents the entities, properties, and logical operators of the specification. The AST comprises nodes representing tokens (such as entity identifiers and properties) and edges representing hierarchical relationships between conditions and operators. In at least one embodiment, the AST is represented as a tree data structure in memory, with each node containing references to child nodes, parent nodes, and metadata about the token type. The AST may also be annotated with semantic information such as data types or schema mappings.

For example, given the input specification {Order}[Total]>100 AND {Order}[Status]="Open", the AST may include a root node representing the logical operator AND. The left child of the root may represent a comparison operator>, having a left subchild node for the property [Total] of the entity Order and a right subchild node for the literal value 100. The right child of the root may represent a comparison operator=, having a left subchild node for the property [Status] of the entity Order and a right subchild node for the literal value "Open". In at least one embodiment, each node in the AST includes a type identifier, links to parent and child nodes, and metadata describing data type or schema information.

At block 210, the AST can be provided to compilation engine 108 for code generation. In at least one embodiment, compilation engine 108 traverses the AST and maps node types to corresponding executable instructions. The instructions may be generated in any of multiple formats, such as intermediate code, virtual machine instructions, or high-level source code.

At block 212, compilation engine 108 applies code templates, optimization rules, and instrumentation hooks to the emitted instructions. Templates may define standard evaluation structures, such as conditionals, loops, or comparison operations, while optimization rules reduce redundant evaluations and fold constant expressions. Instrumentation hooks may be inserted to record intermediate values, operator outcomes, or execution context during runtime. In at least one embodiment, the instrumentation is implemented as lightweight logging statements or event triggers that write to structured log repository 118. This integration enables executable code to be efficient while also providing visibility into intermediate execution states.

At block 214, the final compiled executable code can be produced. The executable code may be stored in memory or persisted for repeated use. In at least one embodiment, the code is associated with the original specification and schema definitions maintained in repositories 116 and 118, enabling traceability between authored specifications and deployed executables.

In operation, the workflow 200 ensures that textual specifications expressed in a DSL are deterministically converted into validated, executable code that can be executed against structured input data. In at least one embodiment, the parsing and compilation workflow improves computing systems by automating the enforcement of rules and conditions, providing systematic validation, and enabling efficient execution with built-in traceability.

Figure 3:
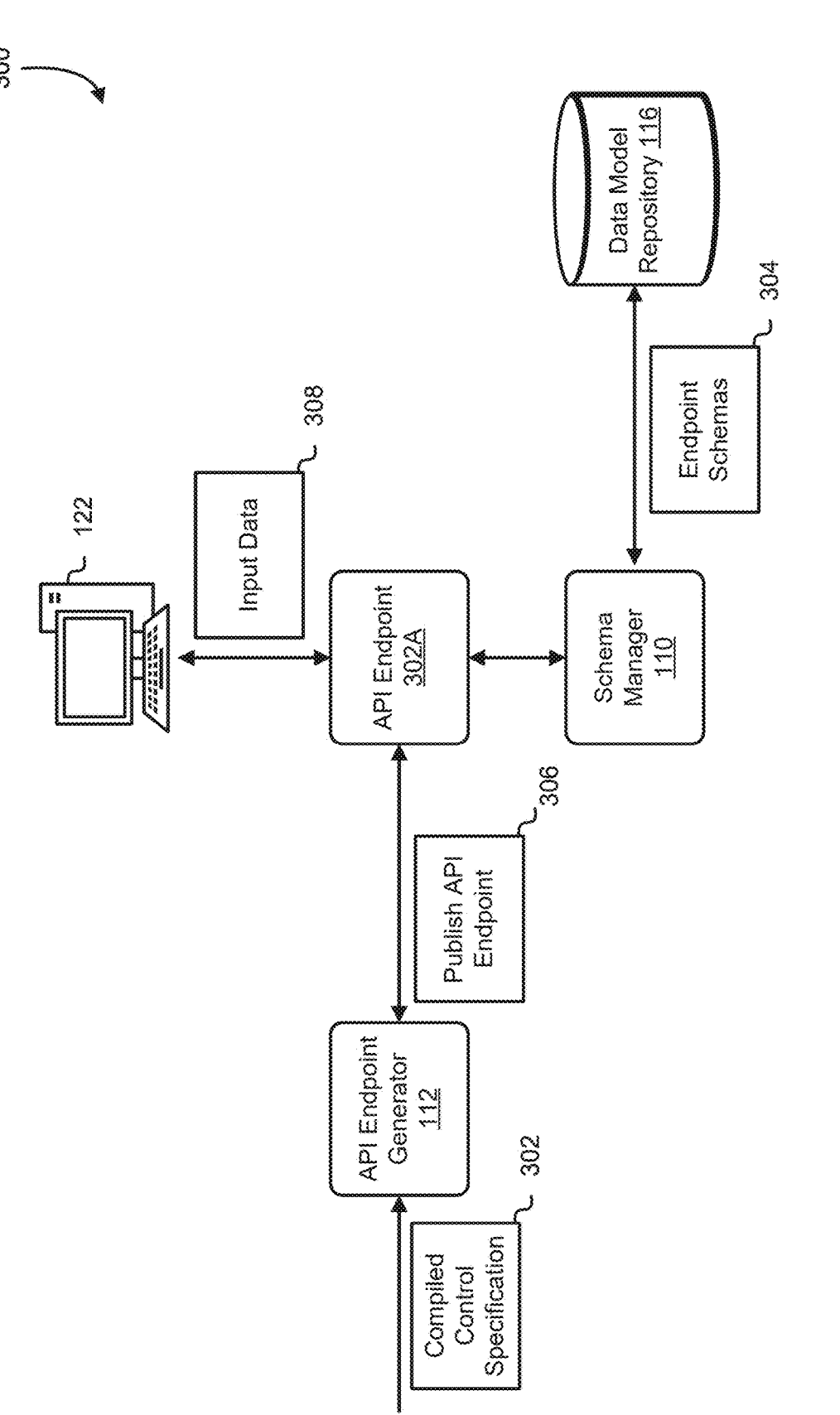
FIG. 3 illustrates an example API endpoint generation and execution workflow performed by the computing system, in accordance with various embodiments.

FIG. 3 illustrates an example API endpoint generation and execution workflow 300 performed by computing system 102. The workflow shows how a compiled control specification can be deployed as a network-accessible endpoint, validated against schemas, and invoked with input data from an external client. In at least one embodiment, workflow 300 is implemented by API endpoint generator 112, schema manager 110, and data model repository 116 of FIG. 1, with endpoint 302A representing the published interface available for client integration. In some embodiments, execution engine 114 and structured log repository 118 may also participate in the workflow to complete downstream evaluation and audit logging. Although not illustrated in FIG. 3, additional components of computing system 102, such as execution engine 114, structured log repository 118, and audit/query interface 120, operate downstream of endpoint 302A as shown in FIG. 1.

Workflow 300 begins with compiled control specification 302, which can be produced by compilation engine 108 of FIG. 2. The compiled control specification may include executable code, metadata describing version identifiers and ownership, and data model annotations that define attributes required for evaluation. In at least one embodiment, the compiled control specification can also include semantic mappings between entities and attributes defined in the specification and corresponding schema constructs, ensuring that endpoint generation is consistent with the original rule semantics. This specification can be provided as input to API endpoint generator 112, which constructs a dedicated API endpoint (e.g., endpoint 302A). Each control specification may result in a unique endpoint 302A, thereby isolating execution logic and ensuring traceability between the authored specification and its deployed interface. The one-to-one mapping between a control and endpoint supports lifecycle management by enabling independent versioning, rollback, or deprecation of controls without affecting unrelated endpoints.

API endpoint generator 112 derives configuration parameters for endpoint 302A, such as the invocation path, transport protocol (e.g., HTTPS, gRPC), and references to input and output schemas. In at least one embodiment, generator 112 integrates with schema manager 110 to automatically merge base schemas (e.g., generic API envelope fields) with control-specific data models. This process yields endpoint schemas 304, which define mandatory fields, optional fields, and data types for incoming requests as well as the structure of responses. Schema manager 110 persists these schemas back into data model repository 116, where they are indexed by control identifiers and version tags for reuse and auditing. In some embodiments, schema manager 110 further generates programmatically consumable schema definitions, such as JSON schema files, to facilitate automatic client-side validation.

Once endpoint 302A has been constructed and associated with endpoint schemas 304, API endpoint generator 112 performs a publication step represented by publish API endpoint 306. At this stage, endpoint 302A becomes externally accessible to client systems such as client 122. In at least one embodiment, publication includes registering endpoint 302A with a service gateway or registry, configuring routing rules for incoming requests, and attaching security requirements such as API keys or OAuth tokens. The generator may also produce interactive endpoint documentation (e.g., a Swagger UI page) that describes the input schema, output schema, example requests and responses, and possible error codes, thereby simplifying integration for external developers. For example, the interactive documentation (e.g., Swagger UI) may present a web interface where developers can select an operation, enter sample input values matching the endpoint schema, and execute live test calls against the endpoint. This enables developers to confirm authentication, routing, and response structure prior to integrating the endpoint into their applications.

Client 122 transmits input data 308 to endpoint 302A. The input data can be structured according to endpoint schemas 304 to ensure that required attributes are present, data types are valid, and semantic constraints (e.g., value ranges or enumerated types) are respected. In at least one embodiment, endpoint 302A validates the incoming payload against the schemas using a schema validation library or equivalent mechanism before forwarding the data downstream. If validation passes, the normalized input data can be made available to execution engine 114 for evaluation. If validation fails, endpoint 302A returns a standardized error response conforming to the output schema, allowing for predictable error handling and client feedback.

In operation, workflow 300 establishes endpoint 302A as the entry point for evaluating a compiled control specification against incoming data. By associating each endpoint with schemas generated by schema manager 110 and stored in data model repository 116, the workflow ensures that execution is both precise and traceable. This architecture avoids schema drift by binding every endpoint to explicit schema definitions and allows administrators to audit input and output contracts across different control versions. In at least one embodiment, additional processing steps such as executing the compiled control code, recording results in structured log repository 118, and producing audit outputs through interface 120 are carried out downstream of endpoint 302A, as described in subsequent figures. These mechanisms improve computing systems by providing deterministic validation, runtime traceability, and auditable evidence of endpoint interactions.

Figure 4:
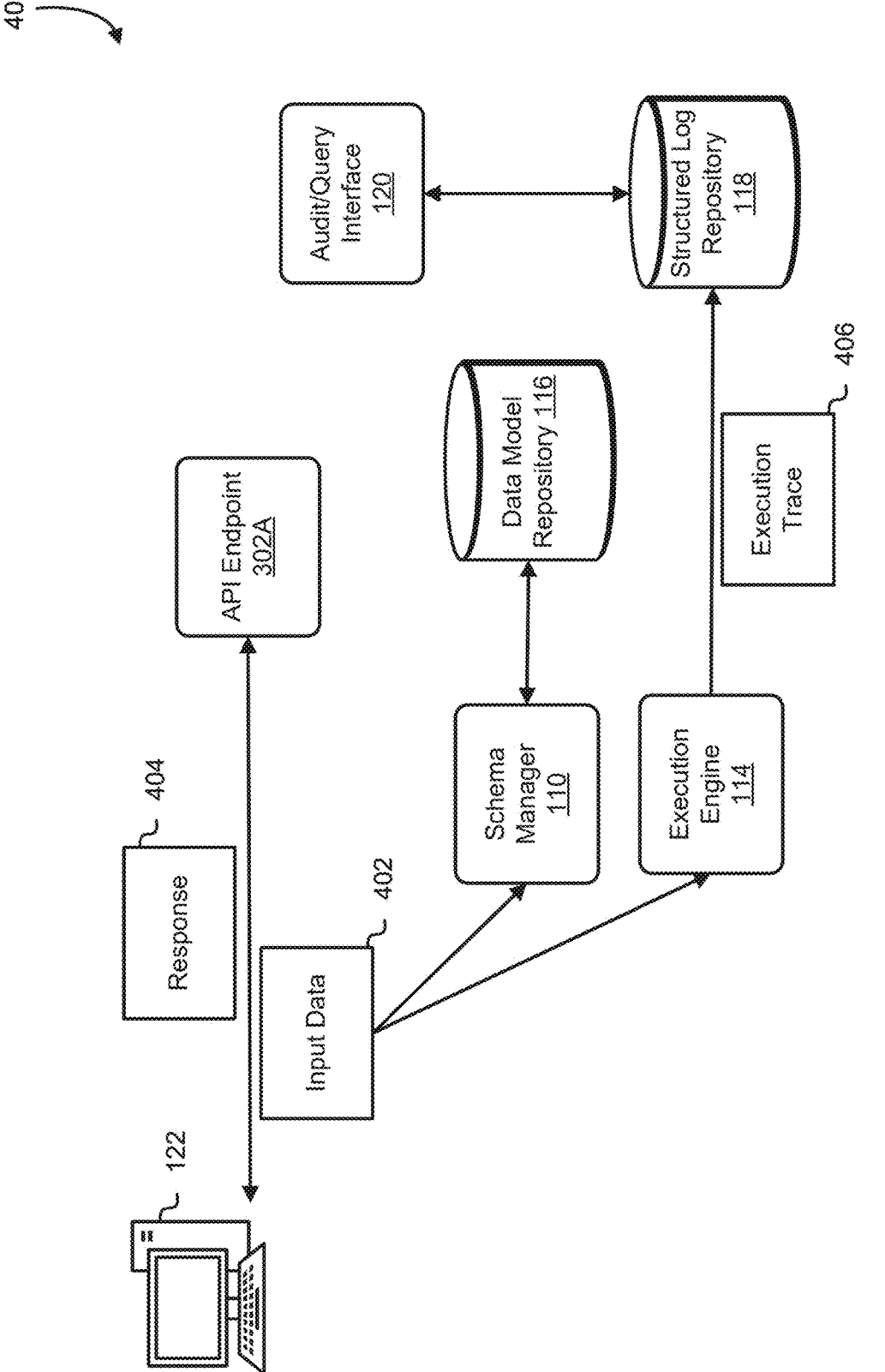
FIG. 4 illustrates an example execution and logging workflow performed by the computing system, in accordance with various embodiments.

FIG. 4 illustrates an example execution and logging workflow 400 performed by computing system 102. The workflow shows how input data 402 can be validated, executed against compiled control logic, and recorded in structured logs for subsequent query and audit. In at least one embodiment, the workflow 400 is implemented using schema manager 110, execution engine 114, data model repository 116, structured log repository 118, and audit/query interface 120 of FIG. 1, with endpoint 302A serving as the entry point for receiving requests.

In operation, client 122 submits input data 402 to endpoint 302A. The endpoint applies schema validation by invoking schema manager 110, which retrieves corresponding schema definitions from data model repository 116. Schema manager 110 ensures that mandatory fields, optional fields, and data types are properly structured before passing the input to execution engine 114. In at least one embodiment, schema manager 110 merges a base schema with control-specific attributes to form endpoint schemas, thereby enforcing both general API requirements and unique control semantics. In at least one embodiment, this prevents schema drift and ensures that every invocation of endpoint 302A is consistent with the data model originally linked to the control specification. If schema validation fails, endpoint 302A returns an error response without invoking the compiled control code.

Execution engine 114 receives validated input data 402 along with schema definitions from schema manager 110 and executes the compiled control logic associated with endpoint 302A. The engine produces both a logical evaluation result and diagnostic information, such as outcomes of individual conditions or intermediate values. In at least one embodiment, the compiled code may be derived from an abstract syntax tree representation of a DSL specification, ensuring deterministic execution. Execution engine 114 may also embed instrumentation hooks to capture intermediate values of operators and conditions, which are persisted as part of an execution trace 406. These intermediate values provide transparency into the evaluation process, allowing administrators to verify how each logical outcome was derived.

Structured log repository 118 maintains indexed records for each execution, including the input data 402, the evaluation result, intermediate trace values 406, timestamps, version identifiers, and unique execution identifiers. The repository may further associate each record with metadata such as the control identifier, author identifiers, and schema version, enabling traceability back to the originating policy and its codified control. In at least one embodiment, structured log repository 118 is implemented as a time-series database optimized for write-heavy operations and indexed queries, allowing rapid retrieval of execution histories. The stored information enables replay, debugging, lifecycle management, and audit of past executions. Audit/query interface 120 consumes data from structured log repository 118 and supports queries by control identifier, execution identifier, user identifier, or time range. The outputs of audit/query interface 120 may include visualized audit trails, tabular reports, or compliance dashboards accessible via user device 122.

In parallel with log recording, execution engine 114 produces a structured response 404 conforming to the output schema defined by schema manager 110. The response 404 includes the logical evaluation result, diagnostic information, and metadata such as a timestamp and execution identifier. In some embodiments, the response also includes execution trace summaries that highlight which conditions were satisfied or failed, thereby providing client 122 with not only a binary compliance outcome but also diagnostic insight into why a decision was made. Endpoint 302A returns response 404 to client 122, thereby completing the request-response cycle.

In at least one embodiment, workflow 400 improves computing systems by integrating schema-level validation, executable evaluation, structured logging, metadata association, and auditable query access into a single deterministic flow. In at least one embodiment, this architecture ensures that each execution of compiled control logic is precise, versioned, and traceable, while enabling external applications and administrators to obtain verifiable evidence of compliance processing. By combining endpoint-specific schemas, deterministic execution traces, and structured log repositories, the disclosed workflow enhances transparency, reduces reliance on manual review, and allows compliance evaluations to be reproduced and verified across distributed environments.

Figure 5:
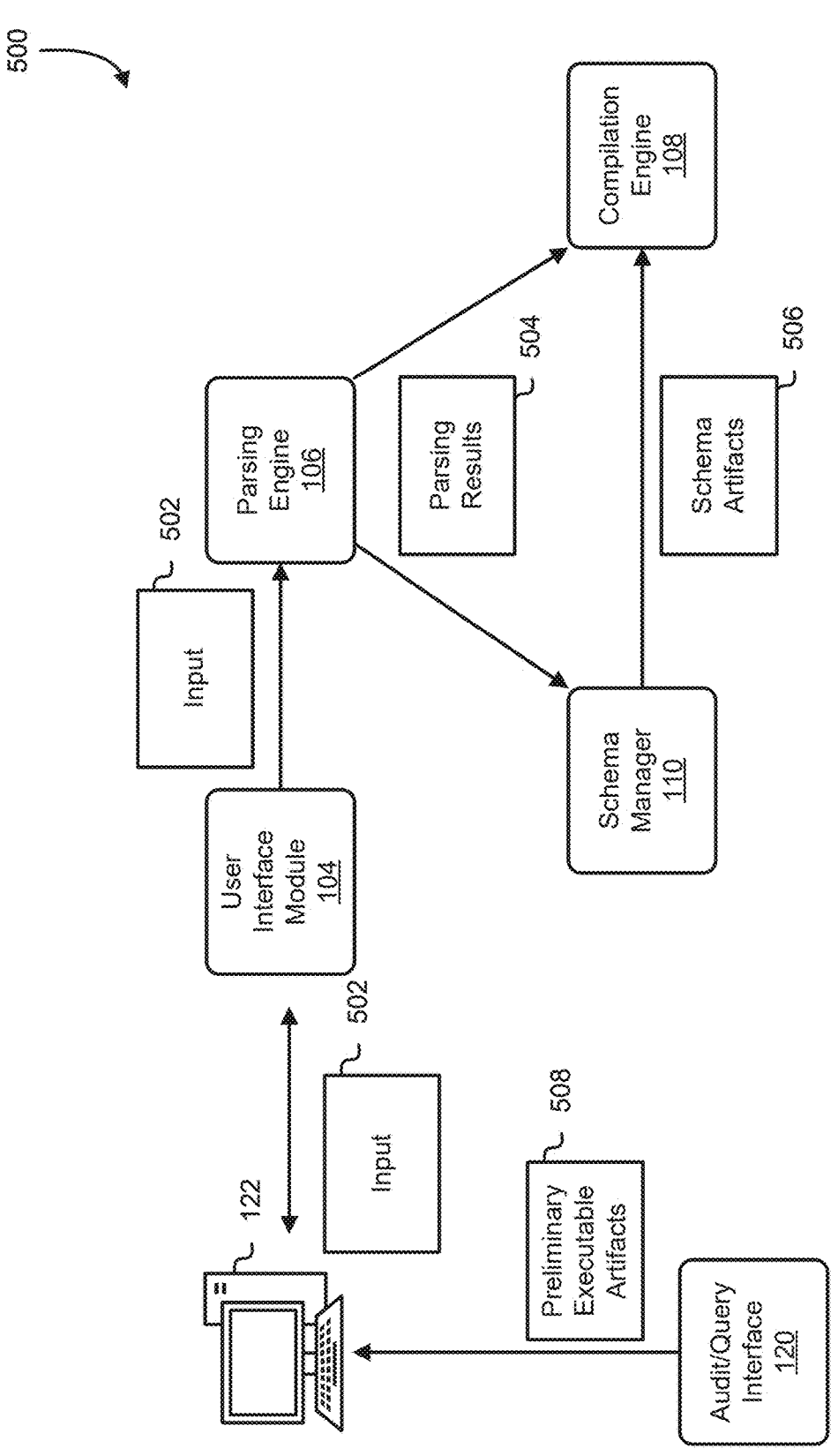
FIG. 5 illustrates an example review and approval workflow performed by the computing system to validate a control specification prior to deployment, in accordance with various embodiments.

FIG. 5 illustrates an example authoring and review workflow 500 performed by computing system 102. The workflow shows how control specification input 502 can be authored, parsed, and prepared for compilation, with parsing results 504, schema artifacts 506, and preliminary executable artifacts 508 produced as outputs for validation and review. In at least one embodiment, workflow 500 is implemented by user interface module 104, parsing engine 106, schema manager 110, compilation engine 108, and audit/query interface 120 of FIG. 1, with user device 122 serving as the source of authored input.

Control specification input 502 can be authored and submitted from user device 122 through user interface module 104. In at least one embodiment, the input is provided in a DSL that uses syntactic tokens to delimit entity identifiers, properties, and logical operators. For example, an entity identifier may be delimited by curly braces, properties by square brackets, and operators by reserved symbols such as ">=" or "AND." User interface module 104 may include syntax highlighting, grammar-aware editing features, and error checking to reduce input errors. Metadata, such as control identifiers, version numbers, or author identifiers, may also accompany input 502 to provide traceability.

Parsing engine 106 receives control specification input 502 and processes it into parsing results 504. In at least one embodiment, parsing engine 106 first tokenizes the input using a lexical analyzer, which may be implemented with finite-state automata to segment the specification into identifiers, operators, literals, and delimiters. In at least one embodiment, the resulting token stream is then validated against a grammar of the DSL, which may be expressed in Backus-Naur Form or an equivalent formalism. When validation succeeds, parsing engine 106 generates an AST that structurally represents entities, attributes, and logical operators. Parsing results 504 may therefore include the AST, semantic annotations such as data types or schema mappings, and error diagnostics for malformed inputs.

Schema manager 110 consumes parsing results 504 to generate schema artifacts 506. In at least one embodiment, schema manager 110 traverses the AST and derives machine-readable data models defining the required structure of input and output data. Schema artifacts 506 may include JSON Schemas specifying mandatory fields, optional fields, enumerated values, and type constraints corresponding to properties identified in input 502. Schema manager 110 may also merge base schemas, defining generic API envelope fields, with control-specific constructs identified in the AST, producing composite models that are reusable across multiple executions. Schema artifacts 506 are persisted in data model repository 116 for versioning, traceability, and reuse.

Compilation engine 108 also consumes parsing results 504, optionally enriched by schema artifacts 506, to generate preliminary executable artifacts 508. In at least one embodiment, preliminary executable artifacts 508 represent intermediate outputs generated during the compilation process before the final executable code is produced. These artifacts may include partially compiled bytecode, unoptimized logic trees, or instruction templates annotated with instrumentation hooks and metadata. By retaining these artifacts, the system supports staged validation and maintains alignment between schema definitions and compiled logic.

In at least one embodiment, compilation engine 108 traverses the AST using recursive descent or other traversal algorithms and maps nodes to instruction templates. The preliminary executable artifacts 508 may comprise intermediate bytecode, interpreted program logic, or instrumented functions designed for testing. Optimization passes may reduce redundant conditions, while instrumentation hooks are inserted to capture intermediate values during evaluation.

Audit/query interface 120 provides access to preliminary executable artifacts 508 for validation and approval. In at least one embodiment, interface 120 presents the artifacts to reviewers on user device 122, where subject matter experts may execute test cases, inspect evaluation traces, and confirm semantic correctness of the compiled logic. Review feedback may be stored as metadata linked to input 502, enabling automated workflows to promote reviewed controls to production or to request revisions when issues are identified.

In operation, workflow 500 enables a staged validation process that bridges authored control specification input 502 with technical compilation and schema generation. By producing parsing results 504, schema artifacts 506, and preliminary executable artifacts 508, the workflow ensures that authored specifications are systematically validated, traceable to their metadata, and reviewable prior to deployment. In at least one embodiment, this staged process improves computing systems by reducing input errors, maintaining schema-level consistency, and providing audit-ready evidence of review before compiled logic is published as executable endpoints.

Figure 6:
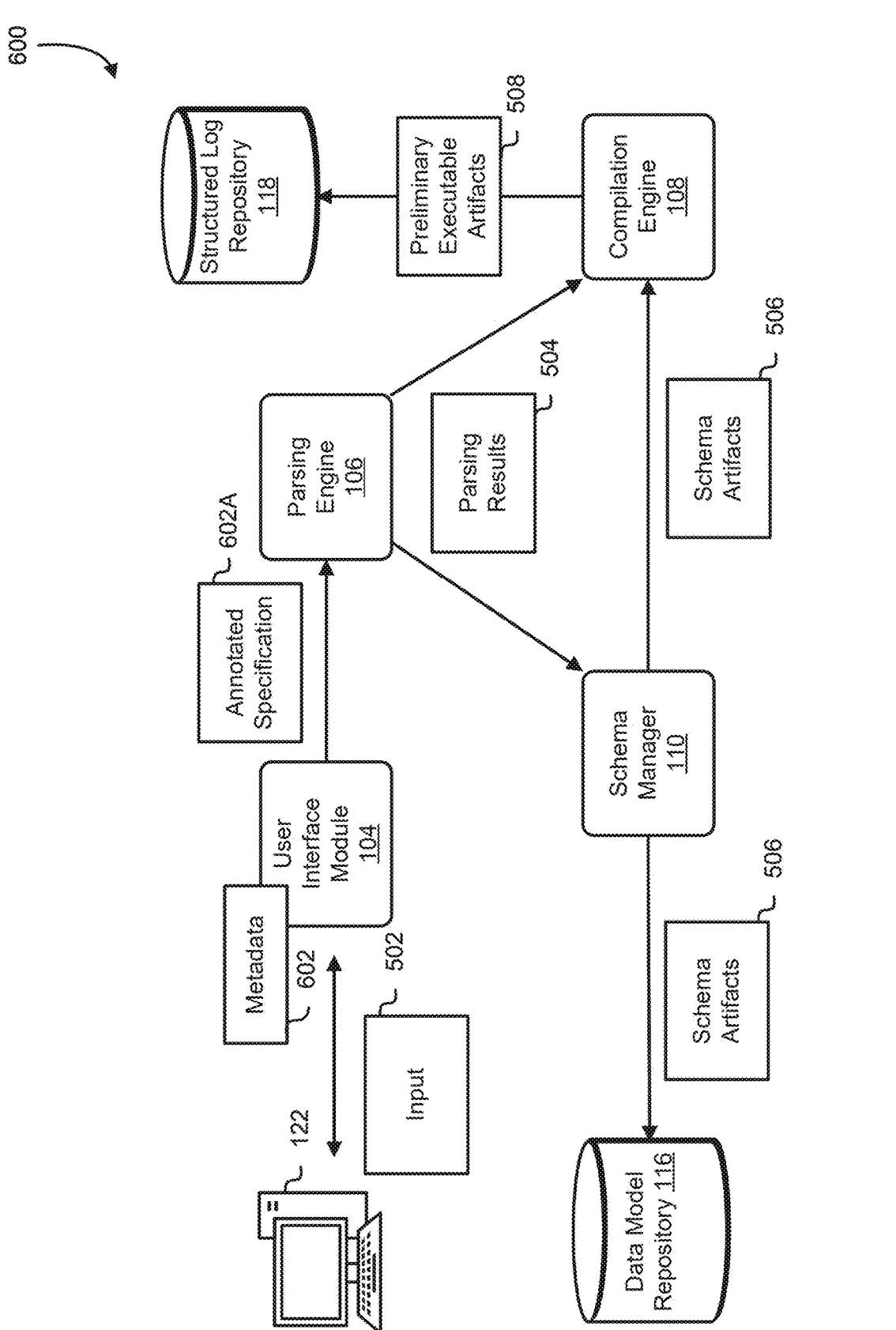
FIG. 6 illustrates an example metadata and annotation workflow performed by computing system, in accordance with various embodiments.

FIG. 6 illustrates an example metadata and annotation workflow 600 performed by computing system 102. The workflow shows how control specification input 502 and metadata 602 are combined to produce an annotated specification 602A, which can be then parsed, compiled, and validated through downstream components. In at least one embodiment, workflow 600 is implemented by user interface module 104, parsing engine 106, schema manager 110, compilation engine 108, data model repository 116, structured log repository 118, and audit/query interface 120 of FIG. 1, with user device 122 serving as the source of both input and metadata.

Control specification input 502 can be authored and submitted through user device 122 to user interface module 104. The control specification may be written in DSL designed for machine evaluation, with syntactic tokens delimiting entity identifiers, properties, and logical operators. For example, entity identifiers may be enclosed in curly braces, properties may be enclosed in square brackets, and logical operators may be represented using reserved symbols such as ">=" ">," or "AND." User interface module 104 may provide syntax highlighting, grammar-aware editing, autocomplete, or other assistance features to reduce errors during input.

Metadata 602 can be also provided through user device 122. In at least one embodiment, metadata 602 includes version identifiers, author identifiers, timestamps, organizational identifiers, and references to related source files or User interface module 104 combines control specification input 502 with metadata 602 to generate annotated specification 602A. In at least one embodiment, annotated specification 602A includes the original DSL rule text enriched with metadata fields, semantic annotations, and cross-references to existing data model attributes stored in data model repository 116. By generating annotated specification 602A, the system ensures that each rule can be self-describing and tightly coupled with versioning and audit information. In at least one embodiment, annotated specification 602A includes both the original DSL expression and additional metadata fields that provide semantic and traceability information. For example, given an input 502 of: {Customer} [Age]>=18 AND {Customer}[Status]="Active", user interface module 104 may augment the input with metadata such as control identifiers, version numbers, author identifiers, and timestamps, producing an annotated specification 602A of the form:

Control ID: CUST-ELIG-001
Version: v1.2
Author: user123
Timestamp: 2025-09-09T14:30:00Z
DSL Expression: {Customer}[Age]>=18 AND {Customer}[Status]="Active"
Semantic Mappings:
{Customer}[Age]→Schema:Customer.age (Integer)
{Customer}[Status]→Schema:Customer.status (Enum: Active, Inactive, Pending)
Logical Operators:
Operator: >=, LHS: {Customer}[Age], RHS: 18
Operator: =, LHS: {Customer}[Status], RHS: "Active"

In this example, annotated specification 602A preserves the original DSL expression while associating its components with schema-level constructs and metadata fields. These annotations allow parsing engine 106 to generate parsing results 504 that are semantically enriched, making subsequent compilation and schema generation steps both deterministic and traceable.

Annotated specification 602A can be transmitted to parsing engine 106, which processes it into parsing results 504. Parsing engine 106 tokenizes the specification into lexical units such as entity identifiers, properties, literals, and operators. The resulting token stream can be validated against the grammar of the DSL, which may be represented in Backus-Naur Form or equivalent. If validation succeeds, parsing engine 106 constructs an AST that structurally represents entities, attributes, and logical operators, optionally annotated with semantic tags derived from metadata 602. Parsing results 504 therefore include the AST, associated semantic mappings, and diagnostic information identifying any syntactic or semantic issues. For example, an exemplary parsing results 504:

```
AST Root: LogicalOperator(AND)
 |-ComparisonOperator(">=")
 |  |-EntityProperty: Customer.Age (Type: Integer)
 |  |Literal: 18
 |ComparisonOperator("=")
    |-EntityProperty: Customer. Status (Type: Enum: Active, Inactive, Pending)
    |Literal: "Active"
```

60 policies. The metadata links each authored specification to its context of origin, providing traceability throughout compilation and execution. Additional metadata may specify ownership of the specification, approval status, lifecycle state (e.g., draft, review, published), and semantic annotations used downstream for schema generation.

Semantic Mappings:
{Customer}[Age]→Schema:Customer.age
{Customer}[Status]→Schema:Customer.status
Diagnostics:
No grammar errors
All entity identifiers resolved
Property types validated against schema Schema manager 110 consumes parsing results 504 to generate schema artifacts 506. In at least one embodiment, schema artifacts 506 include machine-readable input and output schemas, expressed for example in JSON Schema, that define mandatory fields, optional fields, data types, enumerated values, and constraints derived from annotated specification 602A. Schema manager 110 may merge these control-specific schemas with base schemas stored in data model repository 116, thereby producing composite schema models that are consistent with enterprise-wide standards. Schema artifacts 506 are persisted in data model repository 116 for versioning, retrieval, and reuse. Example schema artifacts 506, input and output shown:

```
{
    "$schema": "http://json-schema.org/draft-07/schema#",
    "title": "CustomerControlInput",
    "type": "object",
    "properties": {
        "Customer": {
            "type": "object",
            "properties": {
            "Age": { "type": "integer", "minimum": 0 },
            "Status": { "type": "string", "enum": ["Active", "Inactive", "Pending"] }
        },
        "required": ["Age", "Status"]
        }
    },
    "required": ["Customer"]
}
{
    "$schema": "http://json-schema.org/draft-07/schema#",
    "title": "CustomerControlOutput",
    "type": "object",
    "properties": {
        "evaluationResult": { "type": "boolean" },
        "diagnostics": {
        "type": "array",
        "items": {
            "type": "string"
        }
    },
    "executionId": { "type": "string" },
    "timestamp": { "type": "string", "format": "date-time" }
    },
    "required": ["evaluationResult", "executionId", "timestamp"]
}
```

Compilation engine 108 also consumes parsing results 504, optionally enriched with schema artifacts 506, to generate preliminary executable artifacts 508. In at least one embodiment, preliminary executable artifacts 508 include intermediate program representations such as partially compiled logic trees, unoptimized bytecode, or code segments annotated with instrumentation hooks. These artifacts provide an intermediate stage between the abstract logic of annotated specification 602A and the final executable code described in FIG. 2. Preliminary executable artifacts 508 may include version identifiers and metadata linking the executable logic to its originating annotated specification.

Preliminary executable artifacts 508 are optionally persisted in structured log repository 118, providing an audit trail of intermediate compilation states. In at least one embodiment, structured log repository 118 indexes these artifacts by specification identifier, version identifier, and compilation timestamp, enabling retrieval for later inspection. Storing preliminary executable artifacts 508 enhances transparency, as reviewers can validate not only final execution outcomes but also intermediate compilation logic.

In operation, workflow 600 ensures that each authored specification can be augmented with metadata 602 before parsing, compilation, and schema generation. By producing annotated specification 602A, parsing results 504, schema artifacts 506, and preliminary executable artifacts 508, the workflow supports traceability from authored input through intermediate artifacts to compiled execution. In at least one embodiment, this architecture improves computing systems by embedding metadata at the earliest stages of specification processing, enabling versioned traceability, structured schema derivation, and audit-ready intermediate artifacts that enhance both correctness and accountability.

FIG. 7 is a flowchart illustrating an example of a process 700 for codifying and executing a control specification, in accordance with various embodiments. Some or all of process 700 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 700 may be performed by any suitable system, such as the computing environments and workflows illustrated in FIGS. 1-6. The process 700 includes a series of operations, identified by respective blocks in the following, to transform authored control specifications into executable components, expose them through automatically generated network endpoints, and evaluate incoming data against the compiled controls with integrated traceability and auditability.

At block 702, computing system 102 receives, via user interface module 104, a control specification input 502 expressed in an intermediate representation. The intermediate representation may comprise a DSL distinct from natural language policy descriptions, including syntactic tokens that delimit entity identifiers, properties, and logical operators. In at least one embodiment, a user operating user device 122 enters this control specification into a web-based interface, which may provide syntax highlighting, auto-complete, or grammar-aware editing features to reduce authoring errors. In at least one embodiment, the control specification is transmitted to parsing engine 106 as a structured text stream.

At block 704, computing system 102 associates metadata with the received control. Metadata may include version identifiers 604, user identifiers, team assignments, and references to source policy files. In at least one embodiment, metadata is entered or supplemented at the time of authoring through user interface module 104, which annotates the control input (e.g., annotated specification 602A of FIG. 6). In at least one embodiment, the metadata is persisted in data model repository 116, providing traceability between authored specifications and their corresponding executable forms.

At block 706, computing system 102 maps the control to the original policy description and links the metadata for traceability. Specifically, in at least one embodiment, computing system 102 maps the control to the original policy description and associates the control with metadata identifiers such that downstream artifacts (schemas, executable code, endpoints, and logs) are linked back to the policy description for traceability. Parsing engine 106 validates the tokens against a grammar of the DSL and constructs parsing results 504, including an abstract syntax tree (AST) that structurally represents entities, properties, and operators. In at least one embodiment, semantic annotations such as data type mappings or schema references are attached to the AST, allowing downstream components to maintain a consistent link between natural language policies, codified specifications, and compiled executables.

At block 708, the system assigns the control to one or more responsible teams. In at least one embodiment, user interface module 104 provides fields for entering team identifiers or reviewer assignments, which are linked to the control metadata. Audit/query interface 120 may expose this assignment data to administrators operating user device 122, enabling accountability and routing of review tasks to designated approvers. In at least one embodiment, the assignment of a control to one or more responsible teams can be performed automatically without user intervention. When control specification input 502 can be submitted through user interface module 104, accompanying metadata may include attributes such as control category, domain, or policy type. Parsing engine 106 and schema manager 110 may annotate the specification with this metadata, which can be then cross-referenced against predefined mappings stored in data model repository 116. These mappings associate categories of controls with corresponding team identifiers maintained by the system. Based on the metadata and mappings, computing system 102 automatically assigns the control to the appropriate responsible team or teams. In some implementations, computing system 102 integrates with enterprise directory or identity management services to resolve team assignments dynamically, maintaining alignment with current organizational structures. Once assignment is completed, workflow engines within computing system 102 can automatically notify the assigned teams through audit/query interface 120, dashboard interfaces, or external messaging systems.

At block 710, computing system 102 initiates a review and approval workflow for the control. Review workflows may include automated grammar validation by parsing engine 106, schema validation by schema manager 110, and preliminary code inspection via preliminary executable artifacts 508 produced by compilation engine 108 (see FIG. 5). Human reviewers, operating through audit/query interface 120 on user device 122, may run test cases, inspect schema artifacts 506, or confirm alignment between the specification and policy requirements. Review feedback can be stored as metadata linked to the control specification, providing traceability of approval status.

In at least one embodiment, the activities ordinarily performed by human reviewers through audit/query interface 120 on user device 122 are executed automatically by computing system 102. Upon generation of parsing results 504 and schema artifacts 506, audit/query interface 120 exposes an automated review pipeline that (i) retrieves control specification input 502 and associated metadata from user interface module 104; (ii) executes a stored test suite selected by control category from data model repository 116; and (iii) records results in structured log repository 118. The test suite may include schema-validation vectors (positive/negative payloads that exercise required, optional, and boundary values), property-based tests generated from the JSON schema constraints of schema artifacts 506, and regression cases linked to prior control versions. Execution engine 114 invokes preliminary executable artifacts 508 or compiled code while capturing intermediate values and rule-path coverage metrics; failures, or constraint violations are surfaced as machine-readable diagnostics via audit/query interface 120.

In at least one embodiment, conformance to the source policy description is evaluated without human intervention. Computing system 102 maintains traceability links between segments of the policy description received via user interface module 104 and corresponding nodes in the AST contained in parsing results 504. A conformance checker module accessible through audit/query interface 120 compares required conditions enumerated in the policy description to the compiled condition set, verifying that each required condition can be present and that prohibited conditions are absent. The comparison may use deterministic rule mappings derived during parsing, and optionally natural-language pattern matching to detect omissions or conflicts. Findings and a conformance score are written to structured log repository 118 and surfaced to user interface module 104 as review outcomes.

In at least one embodiment, when all automated checks pass (e.g., all tests succeed, minimum coverage is met, and conformance score exceeds a threshold), computing system 102 marks the control as "review-passed" and advances it in the review sequence without human input. If a check fails, the system automatically generates a defect report containing failing payloads, AST node references, and schema paths, and notifies responsible teams assigned earlier via the metadata-to-team mapping using audit/query interface 120 or external messaging integrations. All automated review artifacts are versioned in data model repository 116 for auditability.

At block 712, computing system 102 compiles the validated control and its associated data model into executable code. Compilation engine 108 traverses the AST to generate program instructions in one or more formats, such as byte-code, virtual machine instructions, or high-level source code in a general-purpose language (e.g., Python or Java). Optimization passes may fold constant expressions, remove redundant conditions, and embed instrumentation hooks for runtime logging. In at least one embodiment, preliminary executable artifacts 508 are generated for staged validation before final executable code is produced and persisted. In at least one embodiment, preliminary executable artifacts 508 represent intermediate outputs generated by compilation engine 108 prior to producing the final executable code. These artifacts serve as a staging layer that enables validation and review before deployment. For example, preliminary executable artifacts 508 may include partially compiled logic trees, intermediate bytecode segments, or instrumented evaluation functions with diagnostic hooks. By generating and exposing these artifacts through audit/query interface 120, the system supports automated or human validation workflows, such as running test cases or verifying schema alignment, without committing to production code. This staged approach improves reliability by detecting errors or inconsistencies early, while also providing traceability between authored specifications and the final persisted executables.

At block 714, computing system 102 automatically generates an API endpoint 302A corresponding to the compiled control. API endpoint generator 112 integrates with schema manager 110 to construct request and response schemas based on the control's data model. These endpoint schemas 304 may include JSON schema definitions specifying mandatory fields, optional fields, and type constraints. Endpoint 302A can be published to a service registry or gateway, making the control remotely accessible to client systems, such as remote clients 124. Documentation artifacts such as OpenAPI specifications may be generated automatically for integration purposes. For example, in at least one embodiment, once schema manager 110 and API endpoint generator 112 define the input and output schemas for endpoint 302A, the system may automatically generate documentation artifacts such as an OpenAPI (Swagger) specification. These artifacts can describe details including the endpoint path and protocol, the input schema with required fields, data types, and constraints, the output schema with evaluation results and metadata, example request and response payloads, and possible error codes such as validation failures or unauthorized access. The documentation artifacts may be published alongside the endpoint, enabling external systems and developers to integrate by directly consuming the specifications through code generators, testing tools, or client libraries.

At block 716, computing system 102 receives input data from client 122 or remote clients 124 via API endpoint 302A. The input data can be structured according to endpoint schemas 304 and validated prior to execution. If validation fails, a standardized error response can be returned without further processing; otherwise, the normalized input can be provided to execution engine 114. In at least one embodiment, input data submitted to endpoint 302A is required to conform to endpoint schemas 304, which define required fields, data types, and constraints. The system validates the input data against these schemas prior to execution, allowing well-structured and compliant payloads to be processed. This validation improves reliability by preventing malformed or incomplete data from reaching execution engine 114.

At block 718, execution engine 114 executes the compiled code using the validated input data. The execution produces a logical outcome, such as a compliance determination, and may also generate intermediate values for conditions and operators, which are included in execution traces. In at least one embodiment, execution engine 114 embeds instrumentation hooks configured during compilation to capture intermediate values and operator results, providing insight into execution behavior. For example, in operation, execution engine 114 applies the compiled executable code to the validated input data and produces a logical outcome, such as a compliance determination indicating whether the data satisfies the conditions expressed in the specification. In at least one embodiment, the execution is not limited to producing a binary result of "pass" or "fail," but also generates intermediate values corresponding to the evaluation of individual conditions, expressions, and logical operators. For example, when a control specifies multiple conditional branches, execution engine 114 records the outcome of each comparison, the truth values of combined logical operators, and the intermediate results leading to the final evaluation result. These intermediate values are collected into an execution trace that provides step-by-step visibility into the evaluation process. In some embodiments, compilation engine 108 configures instrumentation hooks that are embedded into the compiled code. These hooks may include lightweight logging statements, event triggers, or structured output instructions that capture operator results, condition evaluations, and contextual metadata (e.g., timestamps, execution identifiers). By embedding instrumentation at compile time and activating it during runtime, execution engine 114 provides both the final compliance determination and a detailed execution trace that can be persisted in structured log repository 118 for later review through audit/query interface 120. This approach improves transparency, facilitates debugging, and allows execution behavior to be reconstructed and explained in audit scenarios.

At block 720, computing system 102 records evidence of the execution in structured log repository 118. Each execution record may include the input data, evaluation result, intermediate values, timestamps, and execution identifiers. Logs are indexed to support efficient retrieval by audit/query interface 120, which enables administrators or auditors on user device 122 to query by control identifier, execution identifier, or time range. The evidence supports regulatory audits, forensic analysis, and ongoing monitoring of compliance logic.

In operation, process 700 transforms authored control specifications into executable, traceable, and auditable logic. By linking metadata, schemas, endpoints, and execution evidence, the process provides deterministic evaluation, transparent auditability, and consistent enforcement of organizational policies across distributed computing environments.

Note that one or more of the operations performed in 702-720 may be performed in various orders and combinations, including in parallel.

FIG. 8 is a flowchart illustrating an example of a process 800 for parsing and executing a rule expressed in a DSL, in accordance with various embodiments. Some or all of process 800 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 800 may be performed by any suitable system, such as computing system 102 of FIG. 1, or workflows/systems described in FIGS. 2-6. The process 800 includes a series of operations, identified by respective blocks in the following, to parse a DSL rule, compile it into an executable function, and produce an execution trace, in accordance with various embodiments.

The process begins at block 802, where user interface module 104 receives an expression authored in the DSL. The DSL may include syntactic tokens that delimit entity identifiers, properties, and logical operators. For example, an entity identifier might be enclosed in curly braces, a property in square brackets, and operators defined by reserved symbols. The input expression can be transmitted from user device 122 as a structured text stream, accompanied by metadata such as rule identifiers or version tags.

At block 804, parsing engine 106 tokenizes the expression. In at least one embodiment, tokenization is performed by a lexical analyzer implemented with finite-state automata that segments the input into lexical units such as identifiers, operators, and literals. Each token can be tagged with type and position information. For example, in at least one embodiment, tokenization is performed by a lexical analyzer implemented with finite-state automata, implemented by parsing engine 106, that iteratively scans the input character stream and recognizes patterns corresponding to predefined token categories. For example, when the analyzer encounters an opening curly brace, the automaton transitions into a state that captures characters until the matching closing brace, at which point an entity identifier token can be emitted. Similarly, characters enclosed within square brackets are recognized as property tokens, and reserved symbols such as ">=" or "AND" are recognized as operator or logical connector tokens. Each emitted token can be annotated with a type identifier (e.g., entity, property, operator, literal, or connector), a value (the actual string content of the token), and position metadata indicating the location of the token in the original input stream. This metadata facilitates later error reporting by allowing the system to highlight the exact portion of the specification responsible for a parsing error. In some implementations, the lexical analyzer also applies normalization, such as trimming whitespace or converting reserved keywords to canonical forms, so that the downstream parsing process operates on a consistent, structured sequence of tokens rather than unstructured text.

At block 806, parsing engine 106 validates the token sequence against a grammar defined for the DSL. The grammar may be expressed in Backus-Naur Form or equivalent. If validation succeeds, parsing engine 106 constructs an AST representing the hierarchical relationships among entities, properties, and logical operators. The AST may include nodes for entity identifiers, attributes, literals, and logical connectors, and edges that capture parent-child relationships.

At block 808, compilation engine 108 transforms the AST into an executable function. In at least one embodiment, compilation engine 108 traverses the AST recursively, mapping nodes to program instructions, conditionals, or comparison operations. The resulting executable function may be implemented as bytecode, an interpreted logic module, or optimized source code in a general-purpose language. Instrumentation hooks may be embedded at this stage to capture intermediate results during execution.

In at least one embodiment, compilation engine 108 traverses the abstract syntax tree (AST) recursively, beginning at the root node and descending into child nodes in a depth-first manner. Each node in the AST can be associated with a semantic type (e.g., entity reference, property access, operator, or literal value). The compilation engine maps these node types to corresponding program instructions using code templates or rule tables stored in memory. For example, a comparison node ">" may be mapped to a conditional branch instruction that evaluates the left-hand property node against the right-hand literal node. Logical connectors such as AND or OR are mapped to conditional jump sequences or short-circuit evaluation logic, while property nodes are mapped to schema access operations that retrieve the value of an attribute from the input data object.

In some embodiments, the traversal produces intermediate representations, such as bytecode or virtual machine instructions, that abstract away from any specific execution environment. For instance, the engine may emit a sequence of instructions like LOAD [Customer.Age], CONST 18, GT, LOAD [Customer. Status], CONST "Active", EQ, AND. In other embodiments, the traversal outputs high-level code in a general-purpose programming language such as Python or Java, enabling integration with existing runtime environments.

To improve efficiency, the compilation engine 108 may also apply optimizations during traversal, such as constant folding (evaluating "5>3" at compile time rather than runtime), dead-branch elimination (removing logic that can be statically determined to be unreachable), or expression hoisting (moving repeated property lookups into temporary variables). In at least one embodiment, instrumentation hooks are inserted alongside generated instructions to capture intermediate results during execution, allowing evaluation traces to include operator outcomes and condition values for later auditing.

In one illustrative embodiment, compilation engine 108 traverses the AST and emits intermediate instructions as follows:

> LOAD_PROPERTY [Customer. Age]; retrieve Age attribute from input object
> CONST_VALUE 18; push literal 18
> COMPARE_GE; perform "greater than or equal to" comparison
> LOAD_PROPERTY [Customer. Status]; retrieve Status attribute from input object
> CONST_VALUE "Active"; push literal string "Active"
> COMPARE_EQ; perform "equals" comparison
> LOGICAL_AND; combine results of both comparisons
> RETURN RESULT; output final logical outcome In this example, the LOAD_PROPERTY instruction maps property nodes in the AST to schema lookups in the input data object, CONST_VALUE represents literal nodes, and operators such as COMPARE_GE or COMPARE_EQ correspond to comparison nodes. The root logical operator AND is mapped to a LOGICAL_AND instruction that combines results from the two comparison branches.

In at least one embodiment, additional instrumentation hooks may be inserted, for example:

> CAPTURE_TRACE "Customer.Age>=18"; record intermediate comparison result
> CAPTURE_TRACE "Customer. Status==Active"

These hooks ensure that the execution trace preserves not only the final logical outcome but also the intermediate evaluations of each condition and operator, enabling later inspection through audit/query interface 120.

At block 810, execution engine 114 applies the executable function to an input data object structured according to a machine-readable data model. Schema manager 110 may provide a JSON schema or equivalent model defining the attributes required for evaluation. The execution engine 114 validates the input object against the schema before evaluation. Once validated, the engine 114 executes the function, producing a logical outcome indicating whether the input data satisfies the rule conditions.

For example, schema manager 110 may generate a JSON Schema or equivalent schema definition that specifies required fields, optional attributes, data types, and constraints. Before execution, the input data object can be validated against the schema to ensure structural correctness (e.g., confirming that an integer attribute is provided where required, or that enumerated string values fall within an allowed set).

Once validated, execution engine 114 maps identifiers and properties referenced in the AST to corresponding attributes of the input object. For example, an expression such as {Customer}[Age]>=18 is resolved by retrieving the Age attribute from the input object's JSON structure, comparing it to the literal 18, and producing a Boolean result. In at least one embodiment, the function can be executed as a sequence of low-level instructions emitted during compilation, which operate directly on the data object in memory.

Execution may include dereferencing nested attributes, applying type conversions (e.g., coercing strings to integers for comparison), or invoking schema-defined validation routines. Intermediate results from each evaluated condition and logical operator are captured as trace entries, with metadata linking the result to the corresponding entity identifier, property, and operator. These traces are persisted in structured log repository 118 to enable subsequent auditing through audit/query interface 120.

At block 812, execution engine 114 generates an execution trace. In at least one embodiment, the trace includes the logical outcome of the rule and intermediate results corresponding to the evaluation of each condition and logical operator. The trace may also embed metadata such as timestamps and execution identifiers. The trace can be recorded in structured log repository 118 and may be accessed through audit/query interface 120 for later analysis or review.

In at least one embodiment, the execution trace is a structured record that not only captures the final logical outcome of the rule but also preserves intermediate results produced during evaluation of individual conditions and logical operators. For example, if a rule evaluates {Order} [Total]>100 AND {Order}[Status]="Open", the trace may include Boolean outcomes for both the comparison>100 and the equality check="Open", along with the final logical result of the AND operator. Each entry in the trace may be annotated with metadata identifying the specific entity, property, and operator evaluated, as well as the literal values used in the comparison.

The trace may further embed execution metadata such as timestamps, unique execution identifiers, and references to the version of the control specification and schema applied during evaluation. In at least one embodiment, the trace is serialized into a structured format such as JSON or Protocol Buffers and persisted in structured log repository 118, which can be optimized for high-volume write operations and indexed retrieval. This organization allows individual trace entries to be queried by execution identifier, control identifier, or time range.

Through audit/query interface 120, the stored traces can be accessed by administrators, auditors, or automated analysis tools. Example use cases include visualizing condition-by-condition outcomes in a graphical interface, generating compliance reports, or reconstructing execution paths for debugging purposes. In some embodiments, traces can be filtered to return failed evaluations or aggregated across multiple runs to generate statistical insights about how often specific conditions succeed or fail. In at least one embodiment, user device 122 (e.g., a laptop, desktop, or thin client) connects to computing system 102 over a secure interface such as HTTPS. Administrators or auditors may log in via a web-based dashboard or programmatic API exposed through audit/query interface 120 to retrieve execution traces. The device may render visualizations, display execution logs, or export data for external analysis. Automated analysis tools (which might be considered part of remote clients 124) can also access audit/query interface 120 by programmatically invoking its APIs. These clients may use API keys, OAuth tokens, or other authentication methods to query execution traces in bulk and integrate compliance results into larger monitoring or reporting systems.

In operation, process 800 improves computing systems by providing deterministic parsing, transformation, and execution of rules expressed in a DSL, with schema-validated inputs and auditable execution traces. These mechanisms provide consistency, traceability, and explainability when evaluating structured data against complex rule expressions.

Note that one or more of the operations performed in 802-812 may be performed in various orders and combinations, including in parallel.

FIG. 9 is a flowchart illustrating an example of a process 900 for automatically generating and executing an API endpoint corresponding to a codified control, in accordance with various embodiments. Some or all of process 900 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 900 may be performed by any suitable system, such as computing system 102 of FIG. 1 or the workflows and systems described in FIGS. 2-6. The process 900 includes a series of operations, identified by respective blocks in the following, to generate an API endpoint from a codified control, validate incoming input data, execute compiled logic, and return structured responses, in accordance with various embodiments.

The process begins at block 902, where user interface module 104 receives a control specification expressed in a DSL. The DSL may use syntactic tokens to delimit entity identifiers, properties, and logical operators. In at least one embodiment, the DSL defines a formal syntax that uses distinct syntactic tokens to delimit different elements of the control. For example, an entity identifier may be enclosed in curly braces (e.g., {Customer}), a property of that entity may be enclosed in square brackets (e.g., [Age]), and logical operators may be represented using reserved symbols (e.g., >=, =, AND). This tokenization structure allows the system to unambiguously distinguish between entities, attributes, and relational logic during parsing. In at least one embodiment, the control specification is transmitted from user device 122 as a structured text stream, which may also embed metadata fields such as a control identifier, a version tag, or an author identifier. These metadata fields enable traceability of the specification to its originating source, allow different revisions to be managed over time, and support review and approval workflows within the system.

At block 904, parsing engine 106 tokenizes the control specification and validates it against a grammar of the DSL. In at least one embodiment, the parsing engine 106 generates an AST that structurally represents the conditional logic, entities, and properties defined in the control. The AST may also include semantic mappings that link DSL tokens to schema attributes. In at least one embodiment, each node of the AST corresponds to a token type, such as an entity identifier, property, or operator, and edges represent the hierarchical relationships between them. For example, logical operators such as AND or OR may serve as parent nodes, with child nodes representing the individual conditions being combined. The semantic mappings embedded in the AST link these nodes to schema attributes defined by schema manager 110, allowing properties referenced in the DSL to be validated against machine-readable data models. This linkage allows the AST not only to preserve syntactic structure but also to carry semantic meaning, enabling compilation engine 108 to later generate executable instructions that are consistent with the schema definitions. In some embodiments, the AST is annotated with additional metadata, such as data types, constraints, or default values, so that downstream components can enforce validation rules and optimize execution.

At block 906, compilation engine 108 traverses the AST to produce executable code corresponding to the control. In at least one embodiment, the compilation engine maps nodes of the AST to conditional statements, comparison operations, or program instructions. Instrumentation hooks may be embedded during compilation to capture intermediate values and operator results during later execution. In at least one embodiment, the compilation engine 108 traverses the AST using recursive descent or another traversal algorithm, emitting program instructions for each node type. For example, a property node may be compiled into an instruction that retrieves a field from the input object, while an operator node such as ">=" may be compiled into a comparison instruction that evaluates the retrieved value against a literal constant. Logical operators such as AND and OR may be compiled into branching instructions that evaluate the truth values of multiple subconditions and propagate the combined result upward in the execution tree. The compilation process may also incorporate schema artifacts 506, so that generated instructions conform to the expected data types and constraints specified by schema manager 110. Instrumentation hooks can be embedded alongside these instructions, enabling execution engine 114 to record intermediate values during runtime. For instance, when evaluating a comparison such as {Order}[Total]>100, the instrumentation may log both the retrieved numeric value for [Total] and the Boolean result of the comparison. These hooks may write to structured log repository 118, creating a trace of condition-by-condition outcomes that can later be retrieved through audit/query interface 120. In some embodiments, the compiler produces both a fully optimized executable for production use and a version containing expanded instrumentation for testing and review, stored as preliminary executable artifacts 508. This dual-output approach enables staged validation of compiled logic before deployment to endpoint 302A.

At block 908, schema manager 110 generates machine-readable schemas defining input and output structures associated with the control. The input schema specifies required fields, optional fields, and data types expected in incoming payloads, while the output schema defines the logical evaluation result and diagnostic information returned after execution. In at least one embodiment, these schemas act as formal contracts between the endpoint 302A and external clients 124. The input schema ensures that payloads are well-formed and conform to expected structures before execution engine 114 processes them, reducing runtime errors. The output schema provides predictable response formats, allowing client systems to reliably parse evaluation results and associated metadata. By enforcing these contracts, the system improves interoperability, supports automated validation, and maintains traceability across different versions of deployed controls. In at least one embodiment, these schemas are persisted in data model repository 116 for reuse and versioning.

At block 910, API endpoint generator 112 automatically provisions a dedicated API endpoint 302A corresponding to the compiled control. In at least one embodiment, the endpoint is configured with references to the input and output schemas, a unique identifier, and protocol bindings such as HTTPS or gRPC. Documentation artifacts such as OpenAPI specifications may also be generated to describe endpoint behavior for external clients.

At block 912, client 122 transmits input data to endpoint 302A. The input data can be validated against the input schema by schema manager 110 or endpoint logic generated by API endpoint generator 112. If validation fails, an error response conforming to the output schema can be returned directly to client 122. In at least one embodiment, validation process includes checking that all required fields are present, that values conform to expected data types (e.g., string, integer, Boolean), and that constraints such as enumerated values, ranges, or formats are satisfied. For example, if an input schema defines a field [Age] as an integer between 0 and 120, the validation logic rejects inputs outside this range. Similarly, if a field [Status] is constrained to the enumerated values "Active" or "Inactive," the system rejects payloads containing other values. Validation may be performed using schema libraries (e.g., JSON schema validators) integrated with schema manager 110 or by automatically generated code embedded in the endpoint logic. When validation succeeds, the normalized input can be passed to execution engine 114, allowing downstream processing to operate on consistent and predictable data.

At block 914, execution engine 114 applies the compiled executable code to the validated input data. The execution produces a logical outcome, such as whether the input satisfies the conditions of the control, and may also generate intermediate results for each evaluated condition and operator. These intermediate values are embedded in an execution trace for transparency and debugging. In at least one embodiment, execution engine 114 embeds instrumentation hooks configured during compilation to capture the intermediate results in real time. Each intermediate value may be tagged with contextual information such as the entity identifier, property name, operator applied, and data type, enabling a precise reconstruction of how the logical outcome was determined. For example, if the control specifies that {Order}[Total]>100 AND {Order}[Status]="Open", the execution trace may include entries showing that [Total] evaluated to 125 against the >operator and [Status] evaluated to "Open" against the =operator, followed by the overall logical result of TRUE. The trace may also embed metadata such as timestamps, execution identifiers, or schema version identifiers, providing reproducibility. In some embodiments, the trace is persisted in structured log repository 118, where it can later be queried or visualized through audit/query interface 120 on user device 122. This structured evidence enables auditors, administrators, or automated tools to analyze condition-level outcomes, detect systematic issues, or verify compliance with policy requirements.

At block 916, execution engine 114 generates a response conforming to the output schema. The response includes the logical outcome, diagnostic information, and metadata such as timestamps and execution identifiers. In at least one embodiment, the response is serialized in a structured format, such as JSON or XML, conforming to the output schema defined by schema manager 110. The response can include a field for the logical evaluation outcome (e.g., true or false, or a compliance status code), one or more diagnostic fields that record intermediate values or operator results, and metadata fields such as timestamps, execution identifiers, control identifiers, and schema version identifiers. For example, a response may include an object such as {"result": true, "diagnostics": {"Total>100": true, "Status=Open": true}, "metadata": {"executionId": "abc123", "timestamp": "2025-09-10T15:04:05Z", "schema Version": "v2.1"}}. In some embodiments, the response may also include error codes or warnings if certain optional fields were missing, default values were applied, or execution encountered non-fatal anomalies. By enforcing strict adherence to the output schema, the system ensures that all responses are predictable, machine-readable, and suitable for downstream integration with external systems such as monitoring dashboards, compliance reporting pipelines, or automated remediation workflows. The structured response is returned to client 122 via endpoint 302A.

At block 918, execution evidence including input payloads, evaluation results, intermediate values, and metadata is recorded in structured log repository 118. In at least one embodiment, execution evidence recorded in structured log repository 118 comprises a complete record of each evaluation run. This evidence includes the original input payloads received from client 122, normalized into schema-compliant structures; the final evaluation results indicating whether the conditions of the control were satisfied; intermediate values produced for each operator or conditional branch; and metadata fields such as execution identifiers, control identifiers, schema versions, timestamps, and user or system identifiers. Execution evidence may also capture system-level context, such as processing duration, resource utilization, or error codes if encountered during execution. The repository 118 stores this evidence in an indexed, queryable format (e.g., as time-series entries or document objects), enabling retrieval by control identifier, execution identifier, or time range. In some embodiments, evidence records are cryptographically hashed or digitally signed, providing integrity and non-repudiation and supporting use in audits, regulatory reporting, or forensic analysis. The stored evidence may be consumed by audit/query interface 120 for visualization in dashboards, export to external compliance systems, or automated alerting when anomalies are detected across multiple executions. Audit/query interface 120 provides access to these records for administrators and auditors on user device 122, enabling queries by control identifier, execution identifier, or time range.

In operation, process 900 allows codified controls expressed in a DSL to be automatically compiled, exposed as dedicated API endpoints, validated against schemas, executed deterministically, and recorded with full traceability. In at least one embodiment, this process improves computing systems by automating endpoint provisioning, embedding schema-based validation, and maintaining audit-ready execution logs accessible through queryable interfaces.

Note that one or more of the operations performed in 802-812 may be performed in various orders and combinations, including in parallel.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

Figure 10:
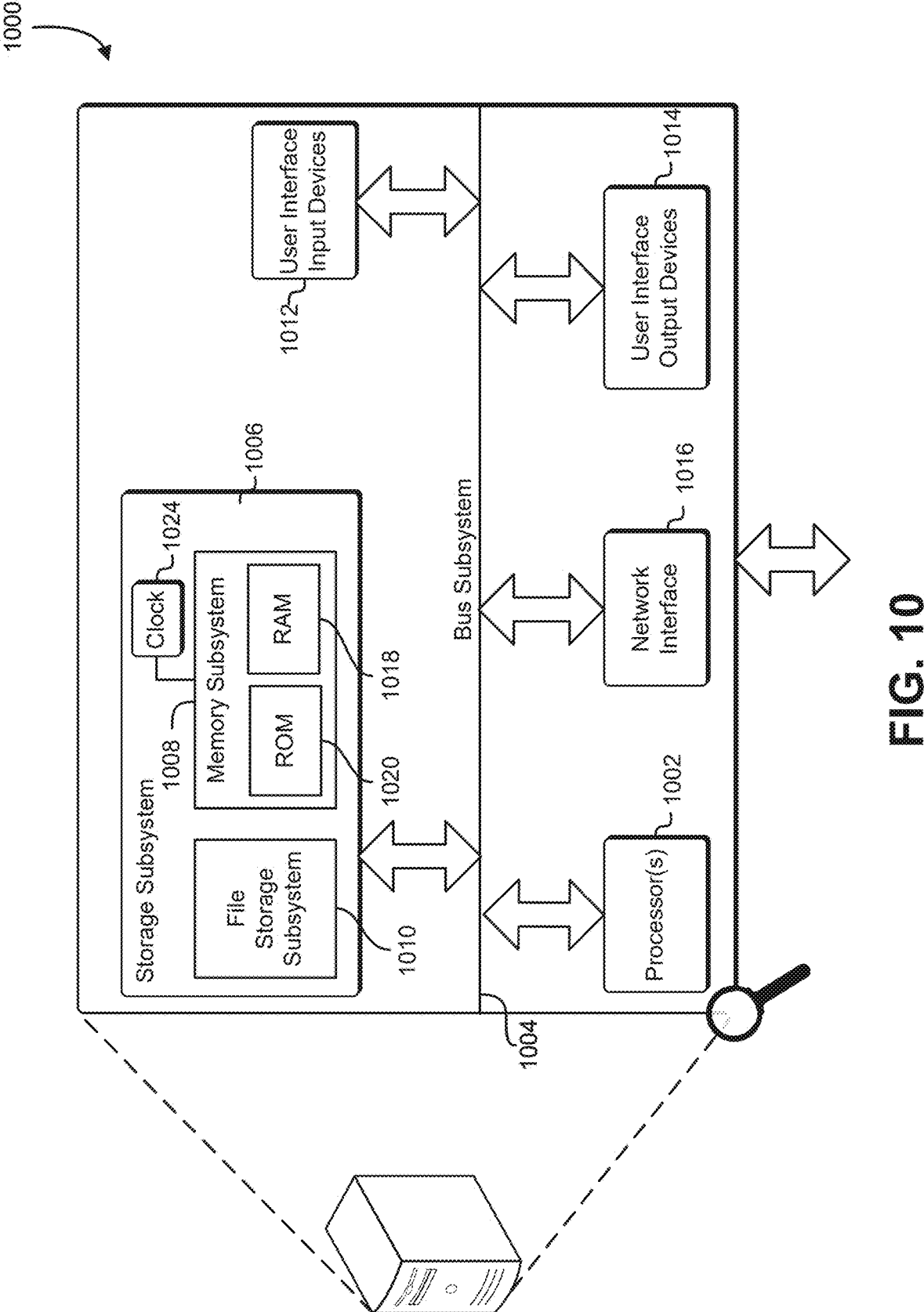
FIG. 10 illustrates a computing device that may be used in accordance with at least one embodiment, one or more of the described computing devices or systems, and/or in an environment in which various embodiments can be implemented.

FIG. 10 illustrates a computing device that may be used in accordance with at least one embodiment, one or more of the described computing devices or systems, and/or in an environment in which various embodiments can be implemented. FIG. 10 depicts an illustrative, simplified block diagram of a computing device 1000 that can be used to practice at least one embodiment of the present disclosure. In various embodiments, the computing device 1000 includes any appropriate device operable to send and/or receive requests, messages, or information over an appropriate network and convey information back to a user of the device. The computing device 1000 may be used to implement any of the systems illustrated and described above. For example, the computing device 1000 may be configured for use as a data server, a web server, a portable computing device, a personal computer, a cellular or other mobile phone, a handheld messaging device, a laptop computer, a tablet computer, a set-top box, a personal data assistant, an embedded computer system, an electronic book reader, or any electronic computing device. The computing device 1000 may be implemented as a hardware device, a virtual computer system, or one or more programming modules executed on a computer system, and/or as another device configured with hardware and/or software to receive and respond to communications (e.g., web service application programming interface (API) requests) over a network.

As shown in FIG. 10, the computing device 1000 may include one or more processors 1002 that, in embodiments, communicate with and are operatively coupled to a number of peripheral subsystems via a bus subsystem. In some embodiments, these peripheral subsystems include a storage subsystem 1006, comprising a memory subsystem 1008 and a file/disk storage subsystem 1010, one or more user interface input devices 1012, one or more user interface output devices 1014, and a network interface subsystem 1016. Such storage subsystem 1006 may be used for temporary or long-term storage of information. In at least some embodiments, the one or more processors 1002 can include graphics processing units (GPUs), such as those provided by NVIDIA and AMD, Graphcore IPUs, IBM Power AI processors, and Qualcomm Snapdragon processors with AI engines.

In some embodiments, the bus subsystem 1004 may provide a mechanism for enabling the various components and subsystems of computing device 1000 to communicate with each other as intended. Although the bus subsystem 1004 is shown schematically as a single bus, alternative embodiments of the bus subsystem utilize multiple buses. The network interface subsystem 1016 may provide an interface to other computing devices and networks. The network interface subsystem 1016 may serve as an interface for receiving data from and transmitting data to other systems from the computing device 1000. In some embodiments, the bus subsystem 1004 is utilized for communicating data such as details, search terms, and so on. In an embodiment, the network interface subsystem 1016 may communicate via any appropriate network that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), Common Internet File System (CIFS), and other protocols.

The network, in an embodiment, is a local area network, a wide-area network, a virtual private network, the Internet, an intranet, an extranet, a public switched telephone network, a cellular network, an infrared network, a wireless network, a satellite network, or any other such network and/or combination thereof, and components used for such a system may depend at least in part upon the type of network and/or system selected. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering. Many protocols and components for communicating via such a network are well known and will not be discussed in detail. In an embodiment, communication via the network interface subsystem 1016 is enabled by wired and/or wireless connections and combinations thereof.

In some embodiments, the user interface input devices 1012 includes one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 1000. In some embodiments, the one or more user interface output devices 1014 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 1000. The one or more user interface output devices 1014 can be used, for example, to present user interfaces to facilitate user interaction with applications performing processes described and variations therein, when such interaction may be appropriate.

In some embodiments, the storage subsystem 1006 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 1006. These application modules or instructions can be executed by the one or more processors 1002. In various embodiments, the storage subsystem 1006 additionally provides a repository for storing data used in accordance with the present disclosure. In some embodiments, the storage subsystem 1006 comprises a memory subsystem 1008 and a file/disk storage subsystem 1010.

In embodiments, the memory subsystem 1008 includes a number of memories, such as a main random-access memory (RAM) 1018 for storage of instructions and data during program execution and/or a read only memory (ROM) 1020, in which fixed instructions can be stored. In some embodiments, the file/disk storage subsystem 1010 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 1000 includes at least one local clock 1024. The at least one local clock 1024, in some embodiments, is a counter that represents the number of ticks that have transpired from a particular starting date and, in some embodiments, is located integrally within the computing device 1000. In various embodiments, the at least one local clock 1024 is used to synchronize data transfers in the processors for the computing device 1000 and the subsystems included therein at specific clock pulses and can be used to coordinate synchronous operations between the computing device 1000 and other systems in a data center. In another embodiment, the local clock is a programmable interval timer.

The computing device 1000 could be of any of a variety of types, including a portable computer device, tablet computer, a workstation, or any other device described below. Additionally, the computing device 1000 can include another device that, in some embodiments, can be connected to the computing device 1000 through one or more ports (e.g., USB, a headphone jack, Lightning connector, etc.). In embodiments, such a device includes a port that accepts a fiber-optic connector. Accordingly, in some embodiments, this device converts optical signals to electrical signals that are transmitted through the port connecting the device to the computing device 1000 for processing. Due to the ever-changing nature of computers and networks, the description of the computing device 1000 depicted in FIG. 10 is intended only as a specific example for purposes of illustrating the preferred embodiment of the device. Many other configurations having more or fewer components than the system depicted in FIG. 10 are possible.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

In some embodiments, data may be stored in a data store (not depicted). In some examples, a "data store" refers to any device or combination of devices capable of storing, accessing, and retrieving data, which may include any combination and number of data servers, databases, data storage devices, and data storage media, in any standard, distributed, virtual, or clustered system. A data store, in an embodiment, communicates with block-level and/or object level interfaces. The computing device 1000 may include any appropriate hardware, software, and firmware for integrating with a data store as needed to execute aspects of one or more applications for the computing device 1000 to handle some or all of the data access and business logic for the one or more applications. The data store, in an embodiment, includes several separate data tables, databases, data documents, dynamic data storage schemes, and/or other data storage mechanisms and media for storing data relating to a particular aspect of the present disclosure. In an embodiment, the computing device 1000 includes a variety of data stores and other memory and storage media as discussed above. These can reside in a variety of locations, such as on a storage medium local to (and/or resident in) one or more of the computers or remote from any or all of the computers across a network. In an embodiment, the information resides in a storage-area network (SAN) familiar to those skilled in the art, and, similarly, any necessary files for performing the functions attributed to the computers, servers or other network devices are stored locally and/or remotely, as appropriate.

In an embodiment, the computing device 1000 may provide access to content including, but not limited to, text, graphics, audio, video, and/or other content that is provided to a user in the form of HyperText Markup Language (HTML), Extensible Markup Language (XML), JavaScript, Cascading Style Sheets (CSS), JavaScript Object Notation (JSON), and/or another appropriate language. The computing device 1000 may provide the content in one or more forms including, but not limited to, forms that are perceptible to the user audibly, visually, and/or through other senses. The handling of requests and responses, as well as the delivery of content, in an embodiment, is handled by the computing device 1000 using PHP: Hypertext Preprocessor (PHP), Python, Ruby, Perl, Java, HTML, XML, JSON, and/or another appropriate language in this example. In an embodiment, operations described as being performed by a single device are performed collectively by multiple devices that form a distributed and/or virtual system.

In an embodiment, the computing device 1000 typically will include an operating system that provides executable program instructions for the general administration and operation of the computing device 1000 and includes a computer-readable storage medium (e.g., a hard disk, random access memory (RAM), read only memory (ROM), etc.) storing instructions that if executed (e.g., as a result of being executed) by a processor of the computing device 1000 cause or otherwise allow the computing device 1000 to perform its intended functions (e.g., the functions are performed as a result of one or more processors of the computing device 1000 executing instructions stored on a computer-readable storage medium).

In an embodiment, the computing device 1000 operates as a web server that runs one or more of a variety of server or mid-tier applications, including Hypertext Transfer Protocol (HTTP) servers, FTP servers, Common Gateway Interface (CGI) servers, data servers, Java servers, Apache servers, and business application servers. In an embodiment, computing device 1000 is also capable of executing programs or scripts in response to requests from user devices, such as by executing one or more web applications that are implemented as one or more scripts or programs written in any programming language, such as Java®, C, C #or C++, or any scripting language, such as Ruby, PHP, Perl, Python, or TCL, as well as combinations thereof. In an embodiment, the computing device 1000 is capable of storing, retrieving, and accessing structured or unstructured data. In an embodiment, computing device 1000 additionally or alternatively implements a database, such as one of those commercially available from Oracle®, Microsoft®, Sybase®, and IBM® as well as open-source servers such as MySQL, Postgres, SQLite, MongoDB. In an embodiment, the database includes table-based servers, document-based servers, unstructured servers, relational servers, non-relational servers, or combinations of these and/or other database servers.

At least one embodiment of the disclosure can be described in view of the following clauses:

Clause 1. A computer-implemented method, comprising: receiving, by a computing system and via a user interface, a control comprising an intermediate representation of a policy description and a data model associated with the control, wherein the control is configured in a machine-readable language distinct from the policy description; associating, by the computing system, metadata with the control, the metadata including version information of the control and one or more users associated with the control; mapping, by the computing system, the control to the policy description and linking the metadata to the policy description for traceability; assigning, by the computing system, the control to one or more responsible teams; initiating, by the computing system, a review and approval workflow for the control; compiling, by the computing system, the control and the associated data model into executable code, the executable code comprising computer instructions to evaluate compliance of the policy description based on the control; automatically generating, by the computing system, an application programming interface (API) endpoint specific to the control, wherein the API endpoint includes a request schema defined by the data model, and wherein the endpoint is published to a network for remote programmatic access; receiving, by the computing system via the API endpoint, input data formatted in accordance with the request schema; executing, by the computing system, the compiled executable code using the input data to automatically determine compliance with the control, the determination performed without human intervention; recording, by the computing system in a non-transitory memory, evidence of each execution of the compiled executable code, the evidence including the input data, an execution result, and a timestamp, wherein the recorded evidence is accessible via an audit interface of the user interface to display execution history associated with the compiled executable code.

Clause 2. The computer-implemented method of clause 1, wherein compiling the control and the associated data model into executable code further comprises generating data structures configured to collect runtime parameters during execution, the data structures including fields for input values, computed intermediate results, and output values.

Clause 3. The computer-implemented method of any one or more of the preceding clauses, wherein the automatically generated API endpoint is configured with both a request schema and a response schema derived from the data model, the response schema specifying data types for values produced by execution of the executable code.

Clause 4. The computer-implemented method of any one or more of the preceding clauses, wherein recording evidence of each execution comprises storing the input data, intermediate values computed by the executable code, and the execution result in a structured log, and indexing the structured log by a unique execution identifier to enable subsequent retrieval.

Clause 5. A computing system, comprising: one or more processors; and one or more non-transitory memory computer-readable mediums comprising computer-executable instructions recorded thereon that, if executed by the one or more processors, cause the computing system to: receive, via a user interface, a control specification comprising an intermediate representation of a rule set and an associated data model, the control specification expressed in a machine-readable language distinct from natural language text; associate metadata with the control specification, the metadata including version identifiers and user identifiers; process the control specification through a review sequence to confirm validity prior to deployment; compile the control specification and the data model into executable code, the compiling comprising generating program instructions configured to evaluate input data objects against conditions defined in the control specification; automatically generate an application programming interface (API) endpoint corresponding to the control specification, the API endpoint including a request schema derived from the data model; receive, via the API endpoint, input data formatted in accordance with the request schema; execute the executable code using the input data to automatically determine an evaluation result; and record, in the non-transitory memory, structured log data for each execution including the input data, the evaluation result, and a timestamp, the structured log data being retrievable through an interface to display execution records associated with the control specification.

Clause 6. The computing system of any one or more of the preceding clauses, wherein compiling the control specification and the data model into executable code comprises generating an abstract syntax tree (AST) representation of the control specification and traversing the AST to emit program instructions.

Clause 7. The computing system of any one or more of the preceding clauses, wherein the API endpoint further comprises a response schema derived from the data model, the response schema defining data types for values generated during execution of the executable code.

Clause 8. The computing system of any one or more of the preceding clauses, wherein receiving input data via the API endpoint comprises validating the input data against the request schema prior to execution of the executable code.

Clause 9. The computing system of any one or more of the preceding clauses, wherein recording structured log data comprises generating a log entry for each execution and indexing the log entry by a unique execution identifier for retrieval.

Clause 10. The computing system of any one or more of the preceding clauses, wherein the metadata associated with the control specification further comprises a reference to a storage location of a source file containing the control specification.

Clause 11. The computing system of any one or more of the preceding clauses, wherein executing the executable code further comprises producing intermediate values for conditional expressions of the control specification and storing the intermediate values in the structured log data.

Clause 12. The computing system of any one or more of the preceding clauses, wherein the interface configured to display execution records comprises a query engine that retrieves subsets of the structured log data based on the unique execution identifier or a time range.

Clause 13. One or more non-transitory computer-readable storage media comprising computer-executable instructions recorded thereon that, if executed by one or more processors, cause the one or more processors to: receive, via a user interface, a control specification comprising an intermediate representation of a rule set and an associated data model, the control specification expressed in a machine-readable language distinct from natural language text; associate metadata with the control specification, the metadata including version identifiers and user identifiers; process the control specification through a review sequence to confirm validity prior to deployment; compile the control specification and the data model into executable code, the compiling comprising generating program instructions configured to evaluate input data objects against conditions defined in the control specification; automatically generate an application programming interface (API) endpoint corresponding to the control specification, the API endpoint including a request schema derived from the data model; receive, via the API endpoint, input data formatted in accordance with the request schema; execute the executable code using the input data to produce an evaluation result; and record, in memory, structured log data for each execution including the input data, the evaluation result, and a timestamp, the structured log data being retrievable through an interface to display execution records associated with the control specification.

Clause 14. The one or more non-transitory computer-readable storage media of any one or more of the preceding clauses, wherein compiling the control specification and the data model into executable code comprises generating an abstract syntax tree (AST) representation of the control specification and traversing the AST to emit program instructions.

Clause 15. The non-transitory computer-readable medium of storage media of any one or more of the preceding clauses, wherein the API endpoint further comprises a response schema derived from the data model, the response schema defining data types for values generated during execution of the executable code.

Clause 16. The one or more non-transitory computer-readable storage media of any one or more of the preceding clauses, wherein receiving input data via the API endpoint comprises validating the input data against the request schema prior to execution of the executable code.

Clause 17. The one or more non-transitory computer-readable storage media of any one or more of the preceding clauses, wherein recording structured log data comprises generating a log entry for each execution and indexing the log entry by a unique execution identifier for retrieval.

Clause 18. The one or more non-transitory computer-readable medium of any one or more of the preceding clauses, wherein the metadata associated with the control specification further comprises a reference to a storage location of a source file containing the control specification.

Clause 19. The one or more non-transitory computer-readable storage media of any one or more of the preceding clauses, wherein executing the executable code further comprises producing intermediate values for conditional expressions of the control specification and storing the intermediate values in the structured log data.

Clause 20. The one or more non-transitory computer-readable storage media of any one or more of the preceding clauses, wherein the interface configured to display execution records comprises a query engine that retrieves subsets of the structured log data based on the unique execution identifier or a time range.

At least one embodiment of the disclosure can be described in view of the following additional clauses:

Clause 1. A computer-implemented method comprising: receiving, by a computing system, a rule, condition set, or other expression expressed in a domain-specific language, the expression comprising: an entity identifier of an entity delimited by a first syntactic token, a property of the entity delimited by a second syntactic token, and one or more logical operators delimiting relationships between the entity identifier and the property; parsing the expression into an abstract syntax tree (AST) representation that structurally represents entities, properties, and conditional logic of the expression; transforming the AST into an executable function, the executable function being configured to evaluate an input data object against the expression; executing the executable function on an input data object that is structured according to a machine-readable data model defining attributes of the entity, the execution producing a logical outcome indicating whether the input data satisfies the expression; and generating an execution trace that provides a record of how the logical outcome was determined, the record comprising: the logical outcome of the expression, and one or more intermediate results corresponding to evaluations of individual conditions and logical operators within the expression.

Clause 2. The computer-implemented method of claim 1, wherein the first syntactic token comprises a pair of delimiters selected from a predefined set of symbols, and the second syntactic token comprises a distinct pair of delimiters from the predefined set, the delimiters distinguishing entity identifiers from entity properties in the domain-specific language.

Clause 3. The computer-implemented method of clause 1, wherein parsing the expression into the abstract syntax tree comprises validating the expression against a grammar of the domain-specific language and rejecting the expression when the entity identifier or property is not defined in the grammar.

Clause 4. The computer-implemented method of any one or more of the preceding clauses, wherein the input data object is defined according to a JSON schema, and transforming the AST into the executable function comprises mapping the entity identifier and property in the AST to attributes of the JSON schema.

Clause 5. The computer-implemented method of any one or more of the preceding clauses, wherein generating the execution trace further comprises storing, for each intermediate result, the corresponding entity identifier, the property evaluated, and the logical operator applied.

Clause 6. A computing system, comprising: one or more processors; and one or more non-transitory memory computer-readable mediums comprising computer-executable instructions recorded thereon that, if executed by the one or more processors, cause the computing system to: receive, via a user interface, a rule expressed in a domain-specific language, the rule comprising an entity identifier of an entity delimited by a first syntactic token, a property of the entity delimited by a second syntactic token, and one or more logical operators delimiting relationships between the entity identifier and the property; parse the rule into an abstract syntax tree (AST) representation that structurally represents the entity identifier, the property, and the logical operators of the rule; transform the AST into an executable function configured to evaluate an input data object against the rule; execute the executable function on the input data object, the input data object being structured according to a machine-readable data model defining attributes of the entity, the execution producing a logical outcome indicating whether the input data object satisfies the rule; and generate an execution trace comprising the logical outcome of the rule and one or more intermediate results corresponding to evaluations of individual conditions and logical operators within the rule.

Clause 7. The computing system of any one or more of the preceding clauses, wherein the first syntactic token comprises a pair of delimiters selected from a predefined set of symbols, and the second syntactic token comprises a distinct pair of delimiters from the predefined set, the delimiters distinguishing the entity identifier from the property in the domain-specific language.

Clause 8. The computing system of any one or more of the preceding clauses, wherein parsing the rule into the abstract syntax tree comprises validating the rule against a grammar of the domain-specific language and rejecting the rule when the entity identifier, the property, or the logical operator is not defined in the grammar.

Clause 9. The computing system of any one or more of the preceding clauses, wherein the machine-readable data model comprises a JSON schema, and transforming the AST into the executable function comprises mapping the entity identifier and the property in the AST to attributes defined in the JSON schema.

Clause 10. The computing system of any one or more of the preceding clauses, wherein the executable function is generated by traversing nodes of the AST and emitting program instructions corresponding to conditional logic of the rule.

Clause 11. The computing system of any one or more of the preceding clauses, wherein executing the executable function further comprises producing intermediate values for each condition and logical operator, and storing the intermediate values in the execution trace.

Clause 12. The computing system of any one or more of the preceding clauses, wherein the execution trace comprises entries associating each intermediate result with a corresponding entity identifier, property, and logical operator.

Clause 13. The computing system of any one or more of the preceding clauses, wherein the execution trace is stored in a structured log that is indexed by a unique execution identifier to enable retrieval of traces for specific executions.

Clause 14. One or more non-transitory computer-readable storage media comprising computer-executable instructions recorded thereon that, if executed by one or more processors, cause the one or more processors to: receive, via a user interface, a rule expressed in a domain-specific language, the rule comprising an entity identifier of an entity delimited by a first syntactic token, a property of the entity delimited by a second syntactic token, and one or more logical operators delimiting relationships between the entity identifier and the property; parse the rule into an abstract syntax tree (AST) representation that structurally represents the entity identifier, the property, and the logical operators of the rule; transform the AST into an executable function configured to evaluate an input data object against the rule; execute the executable function on the input data object, the input data object being structured according to a machine-readable data model defining attributes of the entity, the execution producing a logical outcome indicating whether the input data object satisfies the rule; and generate an execution trace comprising the logical outcome of the rule and one or more intermediate results corresponding to evaluations of individual conditions and logical operators within the rule.

Clause 15. The one or more non-transitory computer-readable storage media of any one or more of the preceding clauses, wherein the first syntactic token comprises a pair of delimiters selected from a predefined set of symbols, and the second syntactic token comprises a distinct pair of delimiters from the predefined set, the delimiters distinguishing the entity identifier from the property in the domain-specific language.

Clause 16. The one or more non-transitory computer-readable storage media of any one or more of the preceding clauses, wherein parsing the rule into the abstract syntax tree comprises validating the rule against a grammar of the domain-specific language and rejecting the rule when the entity identifier, the property, or the logical operator is not defined in the grammar.

Clause 17. The one or more non-transitory computer-readable storage media of any one or more of the preceding clauses, wherein the machine-readable data model comprises a JSON schema, and transforming the AST into the executable function comprises mapping the entity identifier and the property in the AST to attributes defined in the JSON schema.

Clause 18. The one or more non-transitory computer-readable storage of any one or more of the preceding clauses, wherein executing the executable function further comprises producing intermediate values for each condition and logical operator, and storing the intermediate values in the execution trace.

Clause 19. The one or more non-transitory computer-readable storage media of any one or more of the preceding clauses, wherein the execution trace comprises entries associating each intermediate result with a corresponding entity identifier, property, and logical operator, and the execution trace is stored in a structured log indexed by a unique execution identifier to enable retrieval of traces for specific executions.

Clause 20. The one or more non-transitory computer-readable storage media of any one or more of the preceding clauses, wherein transforming the abstract syntax tree into the executable function comprises traversing nodes of the abstract syntax tree and emitting program instructions corresponding to conditional logic of the rule.

At least one embodiment of the disclosure can be described in view of the following additional clauses:

Clause 1. A computer-implemented method comprising: receiving, by a computing system, a control expressed in a domain-specific language, the control comprising a set of conditions to evaluate compliance of input data; parsing, by the computing system, the control into an abstract syntax tree (AST) representation; compiling, by the computing system, the AST into executable code configured to evaluate the input data against the set of conditions; generating, by the computing system, a machine-readable data model defining input attributes required to evaluate the control; automatically generating, by the computing system, an application programming interface (API) endpoint corresponding to the control, the API endpoint including an input schema derived from the machine-readable data model; receiving, via the API endpoint, input data formatted in accordance with the input schema; executing the executable code using the input data to determine whether the input data satisfies the set of conditions; and returning, via the API endpoint, a response conforming to an output schema, the response comprising a logical evaluation result and metadata describing the execution.

Clause 2. The computer-implemented method of clause 1, wherein automatically generating the API endpoint further comprises generating endpoint documentation including the input schema, the output schema, and example requests and responses.

Clause 3. The computer-implemented method of any one or more of the preceding clauses, wherein receiving the input data via the API endpoint further comprises validating the input data against the input schema prior to executing the executable code.

Clause 4. The computer-implemented method of any one or more of the preceding clauses, wherein returning the response further comprises including a timestamp and a unique execution identifier in the metadata to enable traceability of the evaluation.

Clause 5. A computing system, comprising: one or more processors; and one or more non-transitory memory computer-readable mediums comprising computer-executable instructions recorded thereon that, if executed by the one or more processors, cause the computing system to: receive a control expressed in a domain-specific language; compile the control into executable code; generate a data model defining attributes required to evaluate the control; automatically generate an API endpoint corresponding to the control, the API endpoint including an input schema based on the data model; expose the API endpoint to remote clients for submission of input data; execute the executable code using the input data received via the API endpoint; and return a response conforming to an output schema, the response including an evaluation result produced by the executable code.

Clause 6. The computing system of any one or more of the preceding clauses, wherein compiling the control into executable code comprises generating an AST representation of the control and traversing the AST to emit program instructions.

Clause 7. The computing system of any one or more of the preceding clauses, wherein the input schema defines mandatory fields, optional fields, and data types, and the computing system validates the input data against the input schema prior to execution.

Clause 8. The computing system of any one or more of the preceding clauses, wherein the output schema specifies a logical result and one or more diagnostic fields indicating conditions satisfied or not satisfied by the input data.

Clause 9. The computing system of any one or more of the preceding clauses, wherein the computing system automatically generates endpoint documentation including the input schema, the output schema, and sample payloads.

Clause 10. The computing system of any one or more of the preceding clauses, wherein returning the response further comprises embedding metadata including a timestamp and an execution identifier.

Clause 11. The computing system of any one or more of the preceding clauses, wherein the computing system records execution data including the input data, the evaluation result, and execution metadata in a structured log retrievable via a query interface.

Clause 12. The computing system of any one or more of the preceding clauses, wherein the computing system generates multiple API endpoints for different controls and associates each endpoint with its respective data model and executable code.

Clause 13. One or more non-transitory computer-readable storage media comprising computer-executable instructions recorded thereon that, if executed by one or more processors, cause the one or more processors to: receive, by a computing system, a control expressed in a domain-specific language; compile, by the computing system, the control into executable code; generate, by the computing system, a data model defining attributes required to evaluate the control; automatically generate, by the computing system, an application programming interface (API) endpoint corresponding to the control, the API endpoint including an input schema based on the data model; expose, by the computing system, the API endpoint to remote clients for submission of input data; execute, by the computing system, the executable code using the input data received via the API endpoint; and return, by the computing system, a response conforming to an output schema, the response including an evaluation result produced by the executable code.

Clause 14. The computer-implemented method of any one or more of the preceding clauses, wherein compiling the control into executable code comprises generating an AST representation of the control and traversing the AST to emit program instructions.

Clause 15. The one or more non-transitory computer-readable storage media of any one or more of the preceding clauses, wherein the input schema defines mandatory fields, optional fields, and data types, and the computing system validates the input data against the input schema prior to execution.

Clause 16. The one or more non-transitory computer-readable storage media of any one or more of the preceding clauses, wherein the output schema specifies a logical result and one or more diagnostic fields indicating conditions satisfied or not satisfied by the input data.

Clause 17. The one or more non-transitory computer-readable storage media of any one or more of the preceding clauses, wherein the computer-executable instructions, if executed by the one or more processors, cause the computing system to further automatically generate endpoint documentation including the input schema, the output schema, and sample payloads.

Clause 18. The one or more non-transitory computer-readable storage media of any one or more of the preceding clauses, wherein returning the response further comprises embedding execution metadata including a timestamp and an execution identifier.

Clause 19. The one or more non-transitory computer-readable storage media of any one or more of the preceding clauses, wherein the computer-executable instructions, if executed by the one or more processors, cause the computing system to further record execution data including the input data, the evaluation result, and the metadata in a structured log retrievable via a query interface.

Clause 20. The one or more non-transitory computer-readable storage media of any one or more of the preceding clauses, wherein the computer-executable instructions, if executed by the one or more processors, cause the computing system to further generate multiple API endpoints for different controls, and associating each endpoint with its respective data model and executable code.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method comprising:

receiving, by a computing system, a rule, condition set, or other expression expressed in a domain-specific language, the expression comprising:

an entity identifier of an entity delimited by a first syntactic token, a property of the entity delimited by a second syntactic token, and one or more logical operators delimiting relationships between the entity identifier and the property;

parsing the expression into an abstract syntax tree (AST) representation that structurally represents entities, properties, and conditional logic of the expression;

transforming the AST into an executable function, the executable function being configured to evaluate an input data object against the expression;

executing the executable function on the input data object that is structured according to a machine-readable data model defining attributes of the entity, executing the executable function on the input data object producing a logical outcome indicating whether the input data object satisfies the expression; and generating an execution trace that provides a record of how the logical outcome was determined, the record comprising:

the logical outcome of the expression, and one or more intermediate results corresponding to evaluations of individual conditions and logical operators within the expression.

2. The computer-implemented method of claim 1, wherein the first syntactic token comprises a pair of delimiters selected from a predefined set of symbols, and the second syntactic token comprises a distinct pair of delimiters from the predefined set, the delimiters distinguishing entity identifiers from entity properties in the domain-specific language.

3. The computer-implemented method of claim 1, wherein parsing the expression into the abstract syntax tree comprises validating the expression against a grammar of the domain-specific language and rejecting the expression when the entity identifier or property is not defined in the grammar.

4. The computer-implemented method of claim 1, wherein the input data object is defined according to a JavaScript Object Notation (JSON) schema, and transforming the AST into the executable function comprises mapping the entity identifier and property in the AST to attributes of the JSON schema.

5. The computer-implemented method of claim 1, wherein generating the execution trace further comprises storing, for each intermediate result, the corresponding entity identifier, the property evaluated, and the logical operator applied.

6. A computing system, comprising:

one or more processors; and one or more non-transitory memory computer-readable mediums comprising computer-executable instructions recorded thereon that, if executed by the one or more processors, cause the computing system to:

receive, via a user interface, a rule expressed in a domain-specific language, the rule comprising an entity identifier of an entity delimited by a first syntactic token, a property of the entity delimited by a second syntactic token, and one or more logical operators delimiting relationships between the entity identifier and the property;

parse the rule into an abstract syntax tree (AST) representation that structurally represents the entity identifier, the property, and the logical operators of the rule;

transform the AST into an executable function configured to evaluate an input data object against the rule;

execute the executable function on the input data object, the input data object being structured according to a machine-readable data model defining attributes of the entity, executable function on the input data object producing a logical outcome indicating whether the input data object satisfies the rule; and generate an execution trace comprising the logical outcome of the rule and one or more intermediate results corresponding to evaluations of individual conditions and logical operators within the rule.

7. The computing system of claim 6, wherein the first syntactic token comprises a pair of delimiters selected from a predefined set of symbols, and the second syntactic token comprises a distinct pair of delimiters from the predefined set, the delimiters distinguishing the entity identifier from the property in the domain-specific language.

8. The computing system of claim 6, wherein parsing the rule into the abstract syntax tree comprises validating the rule against a grammar of the domain-specific language and rejecting the rule when the entity identifier, the property, or the logical operator is not defined in the grammar.

9. The computing system of claim 6, wherein the machine-readable data model comprises a JavaScript Object Notation (JSON) schema, and transforming the AST into the executable function comprises mapping the entity identifier and the property in the AST to attributes defined in the JSON schema.

10. The computing system of claim 6, wherein the executable function is generated by traversing nodes of the AST and emitting program instructions corresponding to conditional logic of the rule.

11. The computing system of claim 6, wherein executing the executable function further comprises producing intermediate values for each condition and logical operator, and storing the intermediate values in the execution trace.

12. The computing system of claim 6, wherein the execution trace comprises entries associating each intermediate result with a corresponding entity identifier, property, and logical operator.

13. The computing system of claim 6, wherein the execution trace is stored in a structured log that is indexed by a unique execution identifier to enable retrieval of traces for specific executions.

14. One or more non-transitory computer-readable storage media comprising computer-executable instructions recorded thereon that, if executed by one or more processors, cause the one or more processors to:

receive, via a user interface, a rule expressed in a domain-specific language, the rule comprising an entity identifier of an entity delimited by a first syntactic token, a property of the entity delimited by a second syntactic token, and one or more logical operators delimiting relationships between the entity identifier and the property;

parse the rule into an abstract syntax tree (AST) representation that structurally represents the entity identifier, the property, and the logical operators of the rule;

transform the AST into an executable function configured to evaluate an input data object against the rule;

execute the executable function on the input data object, the input data object being structured according to a machine-readable data model defining attributes of the entity, executing the executable function on the input data object producing a logical outcome indicating whether the input data object satisfies the rule; and generate an execution trace comprising the logical outcome of the rule and one or more intermediate results corresponding to evaluations of individual conditions and logical operators within the rule.

15. The one or more non-transitory computer-readable storage media of claim 14, wherein the first syntactic token comprises a pair of delimiters selected from a predefined set of symbols, and the second syntactic token comprises a distinct pair of delimiters from the predefined set, the delimiters distinguishing the entity identifier from the property in the domain-specific language.

16. The one or more non-transitory computer-readable storage media of claim 14, wherein parsing the rule into the abstract syntax tree comprises validating the rule against a grammar of the domain-specific language and rejecting the rule when the entity identifier, the property, or the logical operator is not defined in the grammar.

17. The one or more non-transitory computer-readable storage media of claim 14, wherein the machine-readable data model comprises a JavaScript Object Notation (JSON) schema, and transforming the AST into the executable function comprises mapping the entity identifier and the property in the AST to attributes defined in the JSON schema.

18. The one or more non-transitory computer-readable storage media of claim 14, wherein executing the executable function further comprises producing intermediate values for each condition and logical operator, and storing the intermediate values in the execution trace.

19. The one or more non-transitory computer-readable storage media of claim 14, wherein the execution trace comprises entries associating each intermediate result with a corresponding entity identifier, property, and logical operator, and the execution trace is stored in a structured log indexed by a unique execution identifier to enable retrieval of traces for specific executions.

20. The one or more non-transitory computer-readable storage media of claim 14, wherein transforming the abstract syntax tree into the executable function comprises traversing nodes of the abstract syntax tree and emitting program instructions corresponding to conditional logic of the rule.

\* \* \* \* \*